(12) United States Patent
Naono et al.

(10) Patent No.: US 8,489,508 B2
(45) Date of Patent: Jul. 16, 2013

(54) SERVICE SYSTEM

(75) Inventors: Norihiko Naono, Tokyo (JP); Kunihiko Ohnaka, Tokyo (JP); Mitsutaka Okazaki, Tokyo (JP)

(73) Assignee: Ripplex Inc., Tokyo (JP)

( * ) Notice: Subject to any disclaimer, the term of this patent is extended or adjusted under 35 U.S.C. 154(b) by 0 days.

(21) Appl. No.: 13/274,483

(22) Filed: Oct. 17, 2011

(65) Prior Publication Data

US 2012/0095921 A1  Apr. 19, 2012

Related U.S. Application Data

(63) Continuation of application No. PCT/JP2009/057704, filed on Apr. 16, 2009.

(51) Int. Cl.
G06F 21/00 (2006.01)
(52) U.S. Cl.
USPC .... 705/50; 705/14.23; 705/14.24; 705/14.25; 705/7.29; 705/7.31
(58) Field of Classification Search
None
See application file for complete search history.

(56) References Cited

U.S. PATENT DOCUMENTS

| | | | | |
|---|---|---|---|---|
| 6,366,962 | B1* | 4/2002 | Teibel | 709/245 |
| 7,069,308 | B2* | 6/2006 | Abrams | 709/218 |
| 7,765,130 | B2* | 7/2010 | McQueen et al. | 705/26.1 |
| 7,958,192 | B2* | 6/2011 | Harik et al. | 709/204 |
| 8,271,365 | B2* | 9/2012 | Jung et al. | 705/35 |
| 2002/0120564 | A1* | 8/2002 | Strietzel | 705/40 |
| 2007/0124721 | A1* | 5/2007 | Cowing et al. | 717/100 |
| 2007/0150537 | A1* | 6/2007 | Graham | 709/203 |
| 2008/0243780 | A1* | 10/2008 | Nance et al. | 707/3 |
| 2008/0275899 | A1* | 11/2008 | Baluja et al. | 707/102 |
| 2009/0018918 | A1* | 1/2009 | Moneypenny et al. | 705/14 |
| 2009/0063284 | A1* | 3/2009 | Turpin et al. | 705/14 |
| 2009/0070219 | A1* | 3/2009 | D'Angelo et al. | 705/14 |
| 2009/0083134 | A1* | 3/2009 | Burckart et al. | 705/14 |
| 2009/0132342 | A1* | 5/2009 | Klinger et al. | 705/10 |
| 2009/0132365 | A1* | 5/2009 | Gruenhagen et al. | 705/14 |

(Continued)

FOREIGN PATENT DOCUMENTS

JP 2002-245351 A 8/2002
WO WO2007/142063 A2 * 12/2007

OTHER PUBLICATIONS

JP 2007-323214 Machine language translation corresponding to WO2007/142063A2.*
JP 2002-245351 Machine language translation, Aug. 30, 2002.*

(Continued)

Primary Examiner — Calvin Cheung
(74) Attorney, Agent, or Firm — Novak Druce Connolly Bove + Quigg LLP

(57) ABSTRACT

Multiple service servers can store identification tags, which identify each user, after associating the identification tags with the identification tags of other users; and can also store identification data, which uniquely identifies users across multiple service servers, after associating the identification data with an encryption key for each identification datum. A management server device stores as identification data the user address data encrypted by means of an encryption key that has been generated for each identification datum. A gateway server device receives the identification tags from a first service server, receives the other identification tags associated with the first identification tags, receives the encryption keys associated with the other identification tags, and obtains the encrypted data from the management server. The gateway server device then decodes the encrypted information, and commands delivery that uses the obtained address data.

6 Claims, 30 Drawing Sheets

U.S. PATENT DOCUMENTS

| | | | |
|---|---|---|---|
| 2009/0164323 A1* | 6/2009 | Byrne | 705/14 |
| 2009/0171748 A1* | 7/2009 | Aven et al. | 705/10 |
| 2009/0192871 A1* | 7/2009 | Deacon et al. | 705/10 |
| 2009/0193032 A1* | 7/2009 | Pyper | 707/10 |
| 2010/0010866 A1* | 1/2010 | Bal et al. | 705/10 |
| 2010/0217645 A1* | 8/2010 | Jin et al. | 705/9 |
| 2011/0029370 A1* | 2/2011 | Roeding et al. | 705/14.38 |
| 2011/0213716 A1* | 9/2011 | Ocko | 705/304 |
| 2011/0231240 A1* | 9/2011 | Schoen et al. | 705/14.41 |

OTHER PUBLICATIONS

Kenji Saito, "Skype to Twitter kara Yujin o Jido Toroku sura Address-cho Ripplex1.1", [online], Apr. 28, 2008, ITmedia, [retrieval date Jun. 9, 2009], Internet ,<URL:http://bizmakoto.jp/bizid/articles/0804/28/news049.html>.

Yuhei Iwamoto, "'Tsunagaru' Address Kanri Soft Ripplex Saishinban o Happy—Twitter ya Skype tomo Renkei", [online], Apr. 25, 2008, CNET, [retrieval date Jun. 9, 2009], Internet <URL: http://japan.cnet.com/news/media/story/0,2000056023,20372204,00.htm>.

Atsuyoshi Narumi, "Social Address-cho 'Ripplex', mixiOpenID ni Taio", [online], Oct. 28, 2008, CNET, [retrieval date Jun. 9, 2009], Internet <URL: http://japan.cnet.com/news/media/story/0,2000056023,20382711,00. htm>.

International Search Report issued in PCT/JP2009/057704 dated Jun. 23, 2009.

* cited by examiner

Fig. 7

| Identification tag of service X | Attribute 1 Name | Attribute 2 Birth month | User unique identification tag (UID) | Encryption key |
|---|---|---|---|---|
| IDxa | John Brown | July | | |
| IDxb | Betty Thomas | November | UIDb | Kb |
| IDxc | Dick Ching | March | UIDc | Kc |
| IDxe | Laura Smith | February | | |
| IDxf | Steve Bush | January | UIDf | Kf |
| ... | ... | ... | | |

Fig. 8

(a) Social graph table — 602

| Social graph table | identification tag of aquaintances in service X |
|---|---|
| identification tag of service X (810) | 821 822 823 |
| IDxa (711) | IDxe, IDxe, IDxf |
| IDxb | IDxc, IDxf, IDxh |
| IDxc | IDxa, IDxb |
| IDxe | IDxa, IDxh, IDxj |
| ... | ... |

820

(b) Merchandise table — 611

| Merchandise table | | | |
|---|---|---|---|
| Merchandise Number (850) | Image (860) | Attribute (870) | Price (880) |
| MID1 | P1 | Bouquet | $15 |
| MID2 | P2 | Watch | $60 |
| MID3 | P3 | Bag | $45 |
| MID4 | P4 | Card | $5 |
| ... | ... | ... | ... |

Fig. 10A

| Identification tag in service Y | Attribute 1 Nickname | Attribute 2 Age | User unique identification tag (UID) | Encryption key |
|---|---|---|---|---|
| IDya | bighorn | 25 | | |
| IDyb | nikki | 38 | UIDb | Kb |
| IDyd | naam | 21 | UIDd | Kd |
| IDyf | mitchell | 34 | UIDf | Kf |
| ... | ... | ... | | |

Fig. 10B

| Identification tag of service Y | Identification tags of acquaintances in service Y 1071 1072 |
|---|---|
| IDya | IDyc, IDyd |
| IDyb | IDyd, IDyf |
| IDyd | IDya, IDyf, IDyg |
| IDyf | IDxa, IDxb, IDyd |
| ... | ... |

| Identification tag in service Z | Attribute 1 Name | User unique identification tag (UID) | Encryption key |
|---|---|---|---|
| IDza | John Brown | | |
| IDze | Steve Chen | UIDe | Ke |
| IDzf | Ken Hines | | |
| ... | ... | | |

| Identification tag in service Z | Identification tags of acquaintances in service Y |
|---|---|
| IDza | IDze, IDzf |
| IDze | IDza, IDzf |
| IDzf | IDza, IDze, IDyh |
| ... | ... |

Fig. 16

Table of Session n

| User Unique Identification Tag(UID): | UIDa | Identification Tag of X: | IDxa (John Brown) | |
|---|---|---|---|---|
| Identification Tag of External Service and Name | Identification Tags of Acquaintances | Attribute 1 (Name/Nickname) | UID | Encryption Key |
| IDya (bighorn) | IDyb 1614 | nikki | UIDb | Kb |
| | IDyd 1615 | naam | UIDd | Kd 1644 |

Fig. 18

| User Unique Identification Tag(UID) | Group of Encrypted Identification Tags | Encrypted Recipient Information |
|---|---|---|
| UIDb | Ekb(IDxb-X, IDyb-Y) /1812 | Ekb(Nameb, Addrb) /1831 |
| UIDc | Ekc(IDxc-X, IDwc-W, IDzc-Z) | |
| UIDd | Ekd(IDyd-X, IDzd-W) /1832 | |
| UIDe | Ekf(IDxf-Y, IDyf-Z) | |
| UIDf | Eki(IDwi-Y, IDzi-Z) | |

Fig. 22

Table of Session n

| User Unique Identification Tag(UID): | | UIDa | Identification Tag in X: | IDxa (John Brown) |
|---|---|---|---|---|
| Identification Tag in External Service and Name | Identification Tag of acquaintance | Attribute 1 (Name/Nickname) | UID | Encryption Key |
| IDya (bighorn) | IDyb | nikki | UIDb | Kb |
| | IDyd | naam | UIDd | Kd |
| IDza (John Brown) | IDze | Steve Chen | UIDe | Ke |
| | IDzf | Ken Hines | | |

| Network service | Date | Price |
|---|---|---|
| .... | .... | ... |
| Y | May 1st, 2010 | $15 |
| .... | .... | ... |

Fig. 28

SERVICE SYSTEM

CROSS-REFERENCE TO RELATED APPLICATION

This application is a U.S. continuation application filed under 35 USC 111(a) claiming benefit under 35 USC 120 and 365(c) of PCT application JP2009/057704, filed on Apr. 16, 2009, the entire contents of which are incorporated herein by reference

BACKGROUND OF THE INVENTION

1. Field of the Invention

The present invention is related to an information processing in which a servers are linked and provide a merchandise delivery service.

2. Description of the Related Art

Merchandise sales services are widely used among the many internet services. A user of merchandise sales services on the internet selects merchandises using a web browser, inputs his/her address and name and makes payments using credit cards etc. Then, a provider of merchandise sales service delivers merchandise to a specified delivery address. Almost all providers of merchandise sales services do not provide communication services between a plurality of users using the merchandise purchased by each user.

On the other hand, there are also Internet services which provide communication services between a plurality of users. Electronic mail is the most well know of these services. Electronic mail is a service which provides a means of communication between acquaintances using an electronic mail address as an identification tag for uniquely specifying a user on the internet. In addition, in recent years, many services are appearing which provide a means of communication between users in a web service using an identification tag for uniquely identifying a user within each web service. SNS (Social Network Service), chat, blogs etc are examples of these services (ref. U.S. Pat. No. 7,069,308).

An acquaintance list function is provided in an Internet service which provides such a communication means between users for each user to manage acquaintances in the service. For example, electronic mail client software, web electronic mail, SNS, chat, blogs etc have a function for managing acquaintances.

Generally, entire acquaintance relationships within internet services which provide a means of communication between users are referred to as social graphs. This is because when each user is express as a point (node), it is possible to represent each user's list as a line (edge) which connects pairs of different nodes. That is, these relationships are called social graphs meaning human relationship graphs because it is possible to display entire acquaintance relationships within internet services as a graph.

BRIEF SUMMARY OF THE INVENTION

Given this type of background, there are ideas to promote the use of merchandise sales services by using a social graph held by an internet service which provides communication between acquaintances in merchandise sales internet services. In particular, in merchandise sales service, if an acquaintance list managed by another Internet service is used by a user to send a merchandise card as gift to an acquaintance, there are significant merits to both the user and merchandise sales provider. The merit enjoyed by a user is convenience. If a user uses an acquaintance list in each internet service when purchasing and sending gifts, then it is possible to simplify management of an acquaintance list and sending address information for gifts. In addition, the merit enjoyed by the merchandise sales providers is being able to promote gift purchases.

However, using a social graph of another service which provides communication between acquaintances in merchandise sales internet services, that is, for more than user information services, is rarely realized. There are two reasons for this as follows.

The first reason is a reason for confidentiality of personal information. For example, a provider of electronic mail services generally can not provide an acquaintance list of each user to another service provider in view of confidentiality of personal information.

The second reason is a reason in view of business. For providers of SNS, chat, blog business etc a social graph is the driving force behind encouraging use of services and securing users. Therefore, providing merchandise sales services to others service providers may lead to a reduction is use of ones own services and a loss of users to competing providers, which may result in business risk. In addition, although merchandise sales providers and users of other services social graphs can enjoy the above described benefits using this method, there is no particular merit for the service provider providing the social graph.

In an attempt to remedy this situation, a server, a system, an information terminal and a network related to the invention of the present application provides the merit for being able to solve the above described problem while maintaining the independence of merchandise sales services and network services which provide a social graph when a user of merchandise sales internet services uses an acquaintance list of other internet services. Furthermore, with the server, system, the information terminal and the network related to the invention of the present application, it is also possible to provide clear merits to internet service providers which provide social graphs which is a merit that could not be enjoyed in conventional methods.

As a first aspect of the present invention, a service system is disclosed for delivering merchandise which includes a plurality of service servers, a merchandise delivery server device, a management server device, and a gateway server device which can communicate between the plurality of service servers, the merchandise delivery server device and the management server device, wherein: each service server is capable of associating an identification tag which identifies the user within the service server with an identification tag of another user within the service server and storing the identification tag which identifies the user and the identification tag of another user, and further is capable of associating an encryption key with identification information, the identification information uniquely identifying a user between the plurality of service servers and storing the encryption key with the identification information; the management device includes a storage device for storing a table which stores an identification information of one user in a first column and encrypted information in a second column, said encrypted information being obtained by encrypting an address of the user identified by the identification information stored in the first column with the encryption key stored in one of the plurality of service servers, the encryption key being associated with the identification information of the user stored in the first column; the gateway server device includes a first receiving part which receives first identification tag from a first service server of the plurality of service servers; a second receiving part which receives identification tags of another users associated with an identification tag for identifying the user of the first identification tag received by the first receiving part in any one of the plurality of service servers; a third receiving part which receives a command for selecting an identification tag among the identification tags received by the second receiving part; a fourth receiving part which receives the identification tag and an encryption key if the identification tag and encryption key are associated with the identification tag selected by the command and stored in any one of the plurality of service servers; a fifth receiving part which receives encrypted information associated with the identification tag received by the fourth receiving part and stored in the management server device from the management server device; and the merchandise delivery server device includes a delivery command part which commands a merchandise delivery with address information obtained by decrypting the encrypted information received by the fifth receiving part of the gateway server device with the encryption key received by the fourth receiving part of the gateway server device.

As a second aspect of the present invention, a management server device is disclosed which is capable of communicating with a plurality of service servers, each of the plurality of service servers being capable of associating an identification tag which identifies the user within the service server with an identification tag of another user within the service server and storing the identification tag which identifies the user and the identification tag of another user, and further being capable of associating an encryption key for identification information, said each identification information uniquely identifying a user between the plurality of service servers and storing the encryption key with the identification information; comprising: a storage device which stores an identification information of one user in a first column and encrypted information in a second column, said encrypted information being obtained by encrypting an address of the user identified by the identification information stored in the first column with the encryption key stored in one of the plurality of service servers, the encryption key being associated with the identification information of the user stored in the first column.

As a third aspect of the present invention, the management server device according to the second aspect is disclosed, wherein the encryption key is not stored.

As a fourth aspect of the present invention, the management server device according to the second aspect is disclosed, wherein the service server can associate and store an identification tag of another user of the service server with one identification tag.

As a fifth aspect of the present invention, a gateway server device is disclosed which includes a first receiving part which receives a first identification tag from a first service server of a plurality of service servers, each of the plurality of service servers being capable of associating an identification tag which identifies the user within the service server with an identification tag of another user within the service server and storing the identification tag which identifies the user and the identification tag of another user, and further being capable of associating an encryption key for identification information, said each identification information uniquely identifying a user between the plurality of service servers and storing the encryption key with the identification information; a second receiving part which receives identification tags of another users associated with an identification tag for identifying the user of the first identification tag received by the first receiving part in any one of the plurality of service servers; a third receiving part which receives a command for selecting an identification tag from the identification tags received by the second receiving part; a fourth receiving part which receives the identification tag and an encryption key if the identification tag and the encryption key are associated with the identification tag selected by the common and stored in any one of the plurality of service servers; and a fifth receiving part which receives encrypted information generated using the encryption key associated and stored with the identification tag received by the fourth receiving part.

As a sixth aspect of the present invention, the gateway server device according to the fifth aspect is disclosed further comprising: a decryption part which decrypts the received encryption information using an encryption key associated with the selected identification tag; and a first sending part which sends decrypted address information.

As a seventh aspect of the present invention, the gateway server device according to the fifth aspect is disclosed further comprising: a sixth receiving part which receives address information via the service server from a user identified by the selected identification tag if an encryption key is not associated or stored with the selected identification tag in the service server; an encryption part which generates an encryption key and generates encryption information by encrypting a received address; second sending part which generates identification information for identifying a user identified by the selected identification tag and sending the identification information and generated encryption key to the service server together with the selected identification tag; and a third second part which sends the identification information and the encryption information to the management server device.

As an eighth aspect of the present invention, the gateway server device according to the fifth aspect is disclosed further comprising: a seventh receiving part which receives information which represents the possibility of receiving encryption information from the fifth receiving part from a user identified by the selected identification tag.

As a ninth aspect of the present invention, the gateway server device according to the fifth aspect is disclosed further comprising: a fourth sending part which sends screen information for displaying a first region and a second region, the screen information displaying in the first region the identification tag received by the second receiving part and the possibility of dragging to the second region; and an eighth sending part which sends a command for the third receiving part to receive the identification tag dragged to the second region.

As a tenth aspect of the present invention, the gateway server device according to the ninth aspect is disclosed wherein the screen information can display a third region for displaying sales merchandise information and is information for making dragging of the sales merchandise information to a position at which the displayed identification tag is dragged to in the second region, and further includes a ninth sending part for sending the command for the third receiving part to receive the dragged sales merchandise information.

As an eleventh aspect of the present invention, the gateway server device according to the fifth aspect is disclosed further comprising: a deletion part which deleted received identification tag, encryption tag and encryption information if a communication session with the first service server is complete.

According to an embodiment of the present invention, it is possible for a user of a merchandise sales service to use an acquaintance list of other internet services while maintaining independence of the merchandise sales service and network service which provides a social graph.

BRIEF EXPLANATION OF THE DRAWINGS

FIG. 7 is an exemplary diagram of an identification tag table in which an identification tag is associated with identification information.

FIG. 8 is an exemplary diagram of a table for associating an identification tag with an identification tag of another person and a table for storing merchandise information.

FIG. 10A is an exemplary diagram of a table for associating an identification tag with an identification tag of another person and a table for storing merchandise information.

FIG. 10B is an exemplary diagram of a table in which an identification tag is associated with an identification tag of another person.

FIG. 11A is an exemplary diagram of an identification tag table for associating identification information and an encryption key with an identification tag.

FIG. 11B is an exemplary diagram of a table in which an identification tag of another person is associated with an identification tag.

FIG. 16 is an exemplary diagram of a temporary table stored by the gateway server device.

FIG. 18 is an exemplary diagram of a table stored in the management server device.

FIG. 22 is an exemplary diagram of a temporary table stored by a gateway server.

FIG. 28 is an exemplary diagram of a table for storing the price of a good to be delivered to a user of any service server.

DETAILED DESCRIPTION OF THE INVENTION

The preferred embodiments for realizing the present invention are explained below. Because the scope of the present invention is clearly defined by the scope of the attached patent claims, the embodiments should not be interpreted in a limited manner but should be interpreted as merely aiming to exemplify the general principle of the invention.

Figure 1:
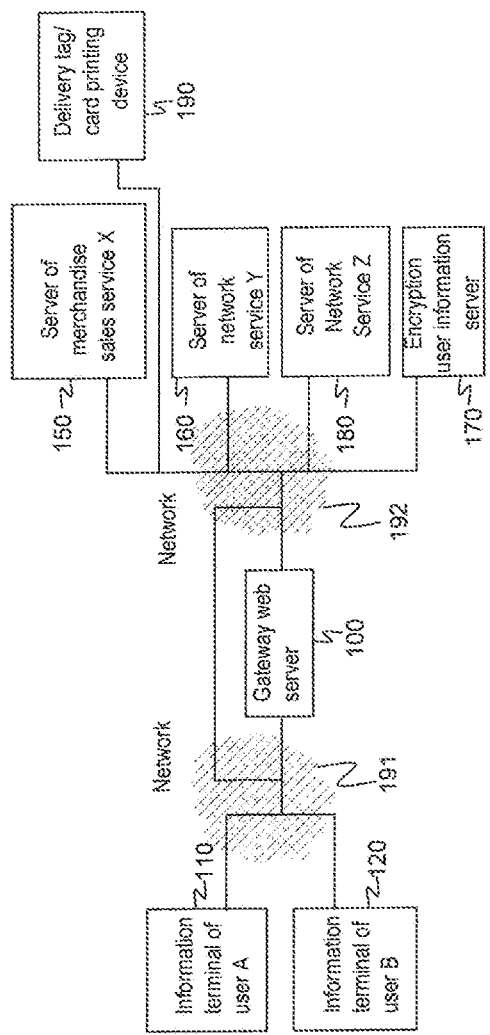
FIG. 1 is a schematic structural diagram of a merchandise sales (delivery) system using a network.

FIG. 1 is a schematic structural diagram of a merchandise sales system which uses a network, which shows an example of an embodiment of the present invention. A gateway web server 100 is connected to a server 150 of merchandise sales service X, a server 160 of merchandise sales service Y, a server 180 of network service Z, an encryption user information server 170, and a sending tag/card printing device 190 via a network 192. In addition, the gateway server 100 is connected an information terminal 110 of a user A and an information terminal 120 of a user B via a network 191. The networks 191 and 192 may be different networks or the same networks. Also, the network service Y and the network service Z may be any network services as long as they are internet services including electronic mails, SNSs, chats, blogs, etc., which comprise social graphs.

Figure 2:
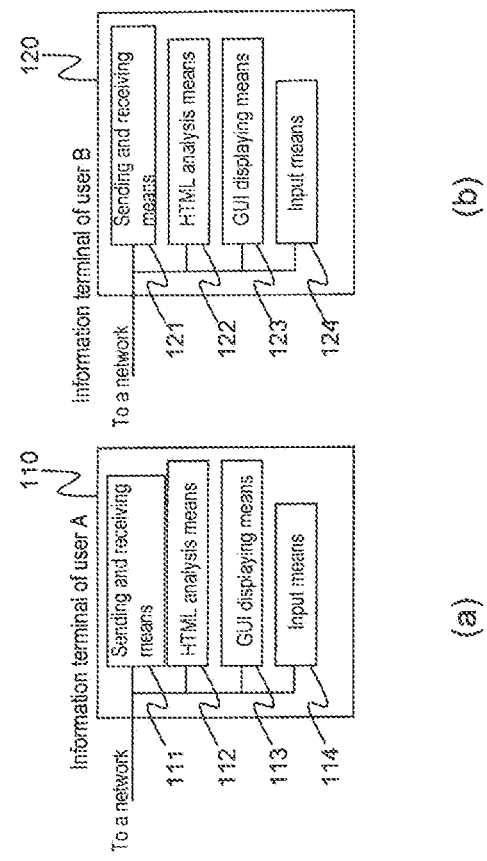
FIG. 2 is a schematic structural diagram of an information terminal.

Schematic structural diagrams of user A's information terminal and user B's information terminal are shown in FIG. 2. The information terminal 110 of user A includes a sending and receiving means 111, a HTML (HyperText Markup Language) analysis means 112, a GUI (Graphical User Interface) display means 113, and an input means 114. The information terminal 120 of user B includes a sending and receiving means 121, a HTML analysis means 122, a GUI display means 123, and an input means 124.

Figure 3:
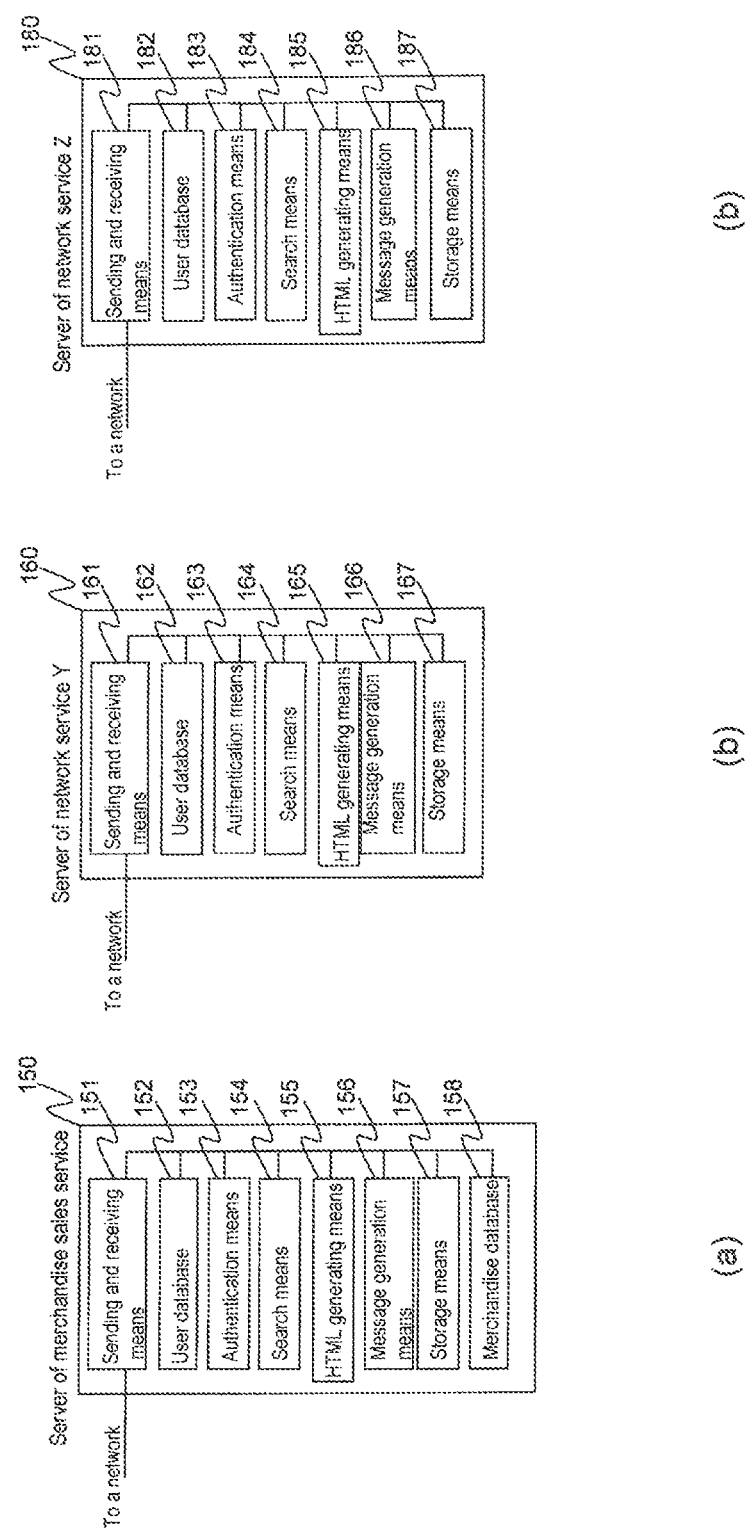
FIG. 3 is a schematic structural diagram of a service server.

Schematic structural diagrams of the server 150 of merchandise sales service X, the server 160 of network service Y, and the server 180 of network server Z are shown in FIG. 3. The server 150 (hereinafter called a server X) of merchandise sales service X includes a sending and receiving means 151, a user database 152 (hereinafter called a user database X), an authentication means 153, a search means 154, a HTML generation means 155, a message generation means 156, a storage means 157, and a merchandise database 158. The server 160 (hereinafter called a server Y) of network service Y includes a sending and receiving means 161, a user database 162 (hereinafter called a user database Y), an authentication means 163, a search means 164, an HTML generation means 165, a message generation means 166, and a storage means 167. The server 180 (hereinafter called a server Z) of network service Z includes a sending and receiving means 181, a user database 182 (hereinafter called a user database Z), an authentication means 183, a search means 184, an HTML generation means 185, a message generation means 186, and a storage means 187.

Figure 4:
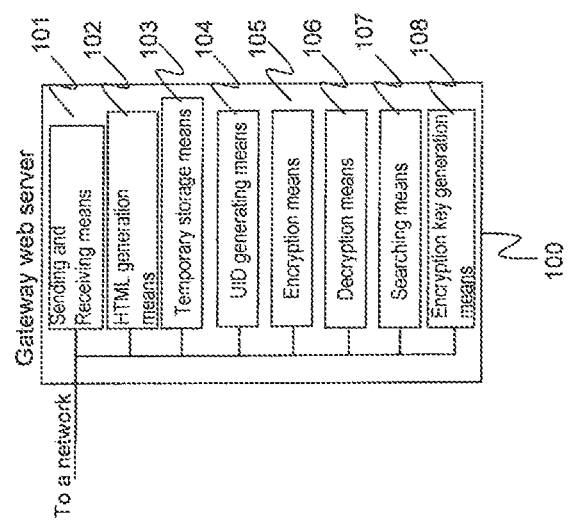
FIG. 4 is a schematic structural diagram of a gateway server device.

A schematic structural diagram of the gateway web server is shown in FIG. 4. The gateway web server 100 includes a sending and receiving means 101, an HTML generation means 102, a temporary storage means 103, a UID generation means 104, an encryption means 105, a decryption means 103, a search means 107, and an encryption key generation means 108.

Figure 5:
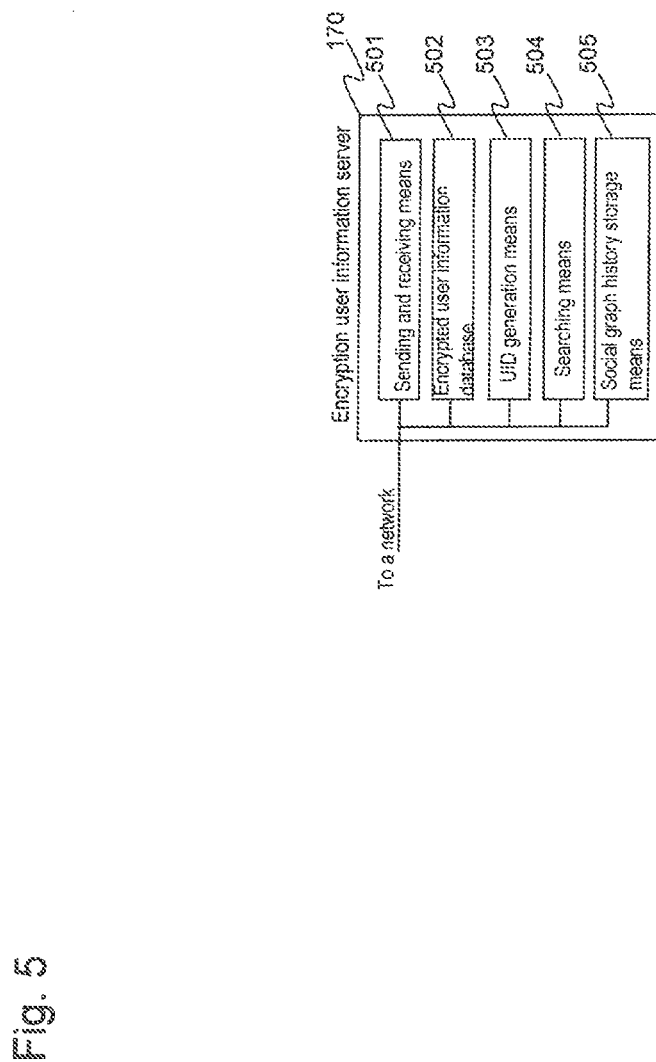
FIG. 5 is a schematic structural diagram of a management server device.

A schematic structural diagram of an encryption user information server is shown in FIG. 5. The encryption user information server 170 includes a sending and receiving means

501, an encryption user information table 502, a UID generation means 503, a search means 504 and a social graph history storage means 505.

Figure 6:
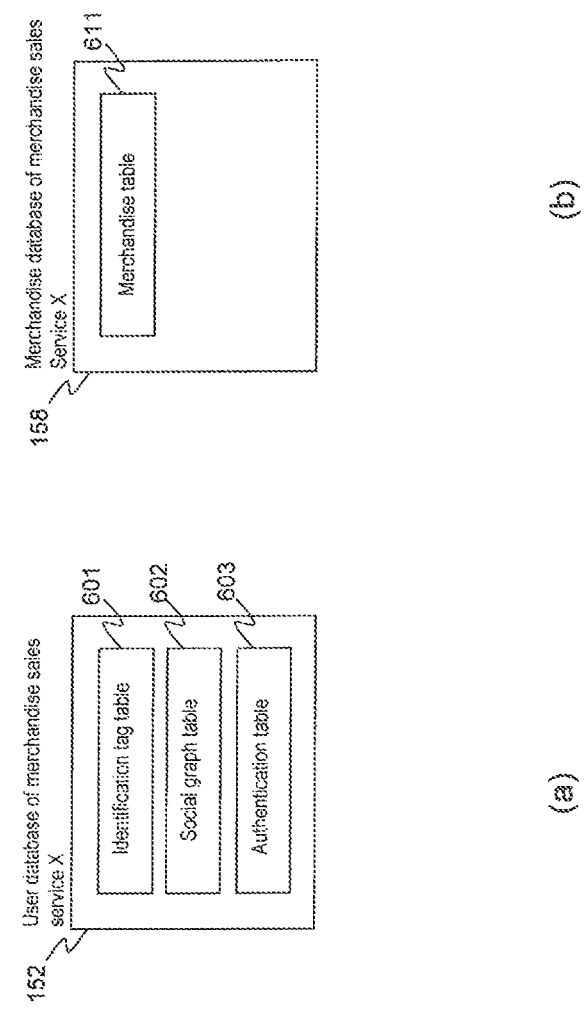
FIG. 6 is a schematic structural diagram of a database used in the server system.

Tables of the user database X 152 and the merchandise database 158 are shown in FIG. 6. The use database X includes an identification tag table 601, a social graph table 602 and an authentication table 603. An identification tag for uniquely specifying each user of the merchandise sales server X is associated with attribute information of each user, a user unique identification tag (hereinafter called a UID) and an encryption key are stored in the identification tag table 601. In addition, an acquaintance relationship in the merchandise sales service X is stored in the social graph table 602. Information used for authentication such as password is associated with an identification tag of each user and stored in the authentication table 603. In addition, the merchandise database 158 of server X includes a merchandise database 611. Product numbers, images, attributes and prices are stored in the merchandise database 611.

An example of the identification tag table 601 of the present embodiment is shown in FIG. 7. The identification tag table 601 includes columns for each of an identification tag 710 for uniquely identifying each user in the merchandise sales service X, a name 720 of each user as an attribute 1, a birthday 730 of each user as an attribute 2, a UID 740 and an encryption keys 750. There may be any number of attributes or none at all. The attribute information may include any information as long as it can be associated with each user.

An example of the social graph table 602 and merchandise table 611 is shown in FIG. 8. For the merchandise sales service X, the social graph table 602 includes two columns, an identification tag 810 for uniquely specifying each user, and an identification tag 820 of a user in an acquaintance relationship with each user. The merchandise table 611 includes each column for merchandise numbers 850, images 860, attributes 870 and prices 880. Here, number of attribute information can be any number. In addition, the merchandise table 611 may include columns other than those shown in FIG. 8.

Figure 9:
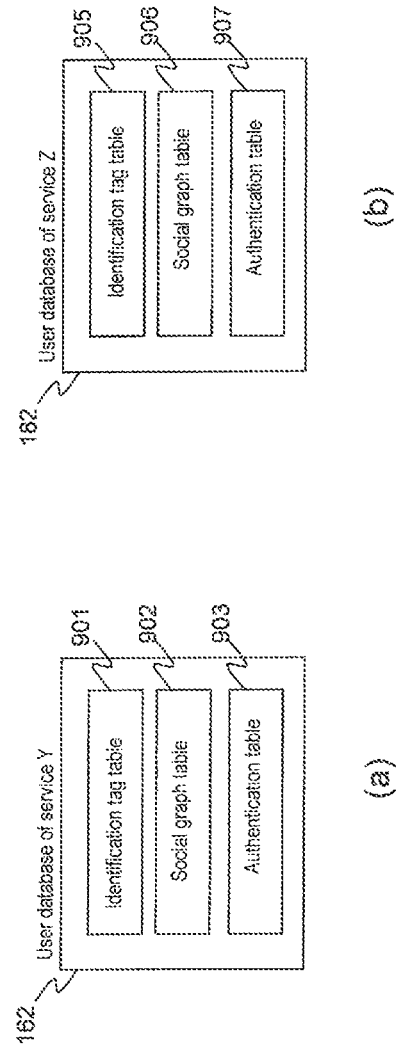
FIG. 9 is a schematic structural diagram of a database used in the server system.

Tables of the user database Y 162 and the user database Z 182 are shown in FIG. 9. The user database Y 162 includes an identification tag table 901, a social graph table 902 and an authentication table 903. An identification tag for uniquely specifying each user of network Y, attribute information of each user, a UID and an encryption key are associated and stored in the identification tag table 901. In addition, an acquaintance relationship within network service Z is stored in the social graph table 902. Furthermore, the user database Y 182 includes an identification tag table 905, a social graph table 906 and an authentication table 907. An identification tag for uniquely specifying each user of network Z, attribute information of each user, a UID and an encryption key are associated and stored in the identification tag table 905. In addition, an acquaintance relationship within network service Y is stored in the social graph table 906.

An example of the identification tag table 901 is shown in FIG. 10A. The identification tag table 901 includes columns for each of an identification tag 1010 for uniquely specifying each user in network service Y, a nickname 1020 of each user as an attribute 1, an age 1030 of each user as an attribute 2, a UID 1040 and an encryption keys 1050. There may be any number of attributes or none at all. The attribute information may include any information as long as it can be associated with each user. In addition, an example of the social graph table 902 is shown in FIG. 10B. The social graph table 902 includes columns for an identification tag 1060 for uniquely specifying each user in the network service Y, and an identification tag 1070 of a user which has an acquaintance relationship with each user. Furthermore, the authentication table 903 stores authentication information such as a password which is associated with an identification tag of each user.

An example of the identification tag table 905 is shown in FIG. 11. The identification tag table 905 includes columns for each of an identification tag 1110 for uniquely specifying each user in the network Z, a name 1120 of each user as an attribute 1, a UID 1130, and an encryption key 1140. There may be any number of attributes or none at all. The attribute information may include any information as long as it can be associated with each user. In addition, an example of the social graph table 906 is shown in FIG. 11B. The social graph table 906 includes columns for an identification tag 1150 for uniquely specifying each user in the network Z, and an identification tag 1160 of a user who has an acquaintance relationship with each user. Furthermore, the authentication table 907 stores authentication information such as a password which is associated with an identification tag of each user.

Furthermore, an identification tag for uniquely specifying a user in each service is always denoted in an IDst format in the present specification. Here, s represents the name of the web service which uniquely identifies a user using this identification tag, and t represents the user. For example, IDxa represents an identification tag of user A in the merchandise sales service X. Similarly, IDya represents an identification tag of user A in the network service Y. In this case, user A is a user of both merchandise sales service X and network service Y. Actually, an identification tag of merchandise sales service X and network service Y are both independent, and although there is no method for the server of merchandise sales service X or the server of network service Y detecting the fact that user A uses both merchandise sales service X and network service Y, this type of denotation is used in the present specification for clarifying the details of the present invention. In addition, in the present specification, a merchandise number for uniquely specifying the type of merchandise is denoted in a MIDn format.

Figure 12:
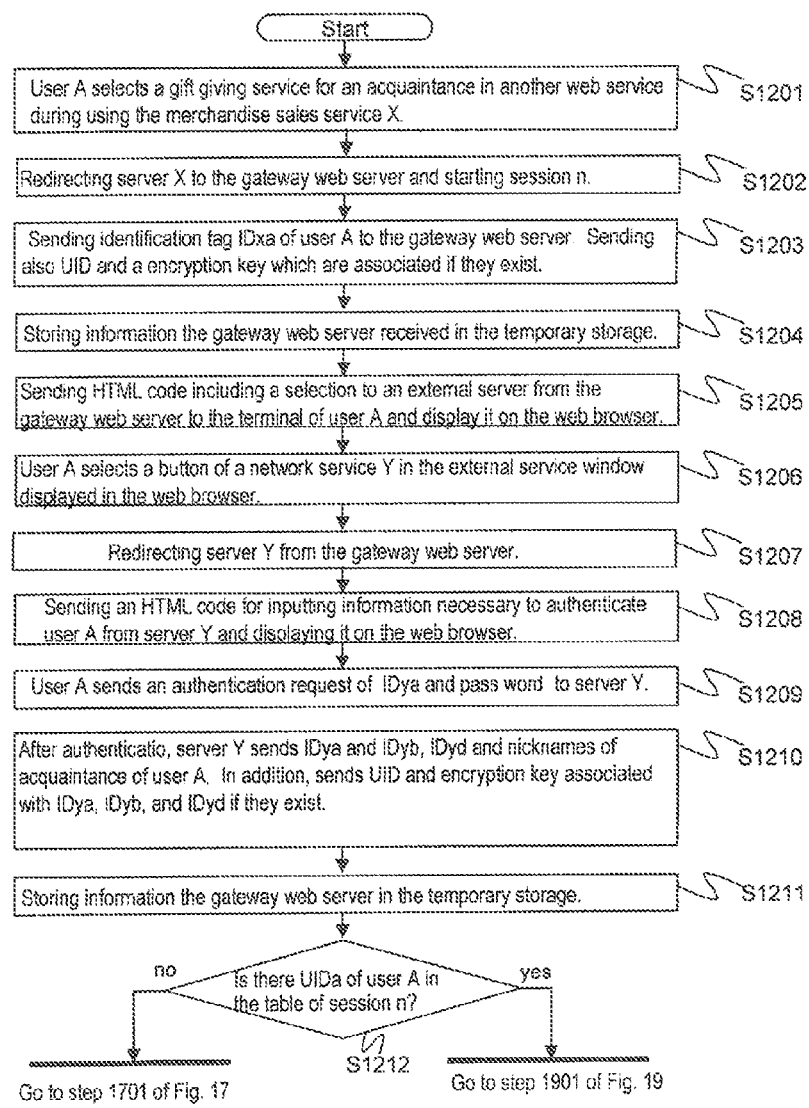
FIG. 12 is a flowchart of a process in the gateway server device.

Next, a process whereby user A sends a piece of merchandise to an acquaintance in the merchandise sales service X using the server, the information terminals, the networks, and the system related to the invention of the present application is explained using the flowchart in FIG. 12.

Now, user A uses merchandise sales service X via the information terminal 110. At this time, an HTML code which is generated by the HTML generation means 155 of the server in merchandise sales service X, and sent to the information terminal of user A via sending and receiving means 151 and network 192 and network 191, is analyzed by the HTML analysis means 112 and the result is displayed on the GUI display means 113. Before this, user A sends an identification tag IDxa and a password in the merchandise sales service X from the information terminal 110 to the server of the merchandise sales service X, and the authentication means 153 authenticates access from the information terminal 110 of user A. The authentication method is not limited to a combination of an identification tag and a password and it is sufficient that the authentication means 153 can authenticate access from the information terminal 110 of user A or access from user A him/herself. Furthermore, in the embodiments explained below, the user of merchandise sales service X has an identification tag and server X authenticates user A, however, the merchandise sales service X does not have to issue an identification tag for uniquely identifying each user.

Next, user A select a gift giving service for an acquaintance in another web service, which is included in the merchandise sales service X (step S1201). This is performed by user A by selecting, for example, a button, an image, or a character string, etc. for displaying "send a gift/letter to an acquaintance of another service" displayed on a screen of merchandise sales service X. The merchandise sales service X as described above is provided by the server 150 of the server X, however, it is one part of the merchandise sales service X. A gift giving service, which is one part of the merchandise sales service X, for acquaintance in another web service is provided by the gateway web server 100. That is, when user A selects a gift giving service for an acquaintance in another web service using an input/output means on user A's information terminal, a request is sent to the server 150 of the merchandise sales service X via network 191 and 192, and the sending and receiving means 151 redirects the request to the gateway web server. At this point, as session n of the gift giving service for an acquaintance in another web service begins (step S1202). Next, the sending and receiving means 151 sends the identification tag IDxa and the name of user A to the gateway web server 100. In addition, in the case where a user unique identification tag (hereinafter called a UID) of user A and an encryption key exists, these are associated with IDxa and sent to the gateway web server (step S1203). This transmission may be performed in plain text mode or in encrypted mode. It is not sent to the server if it does not exist. Referring to FIG. 7, because a UID which corresponds to IDxa 711 does not exist in the UID column 740, it is not sent. Here, a UID is an identification tag for uniquely specifying each user across a plurality of servers. A UID will be explained in detail below. In the present description of the invention, the notation UIDm indicates the UID of a user M.

Figure 13:
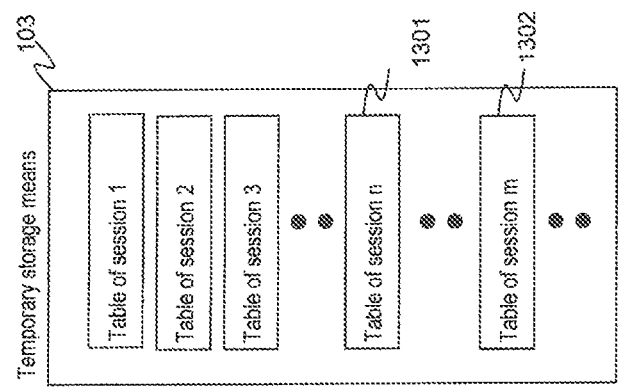
FIG. 13 is a diagram which shows that it is possible for the gateway server device to store a plurality of temporary tables.

Next, the sending and receiving means 101 of the gateway web server receives this information and stores it in the temporary storage means 103 (step S1204). The temporary storage means 103 is a means for temporarily storing information for each session of the gift giving service for an acquaintance in another web service and the information is deleted after each session is completed. Generally, while the main storage means of a computer comprised from DRAM (Dynamic Random Access Memory) is often used as a temporary storage means, the temporary storage means can be realized by any device as long as the contents are deleted after each session completed. An example of a temporary storage means is shown in FIG. 13.

A table is created for each session in the temporary storage means 103. The gateway web server can execute a plurality of sessions in parallel. As a result, as is shown in FIG. 13, an arbitrary number of tables including zero exist in the temporary storage means 103 at any arbitrary moment. Each table is stored in the temporary storage means 103 while a session is in operation but is deleted when the session is completed. Information which is received from the server of the merchandise sales service X in step S1204 described above is stored in a table 1301 of session n in FIG. 13.

Figure 14:
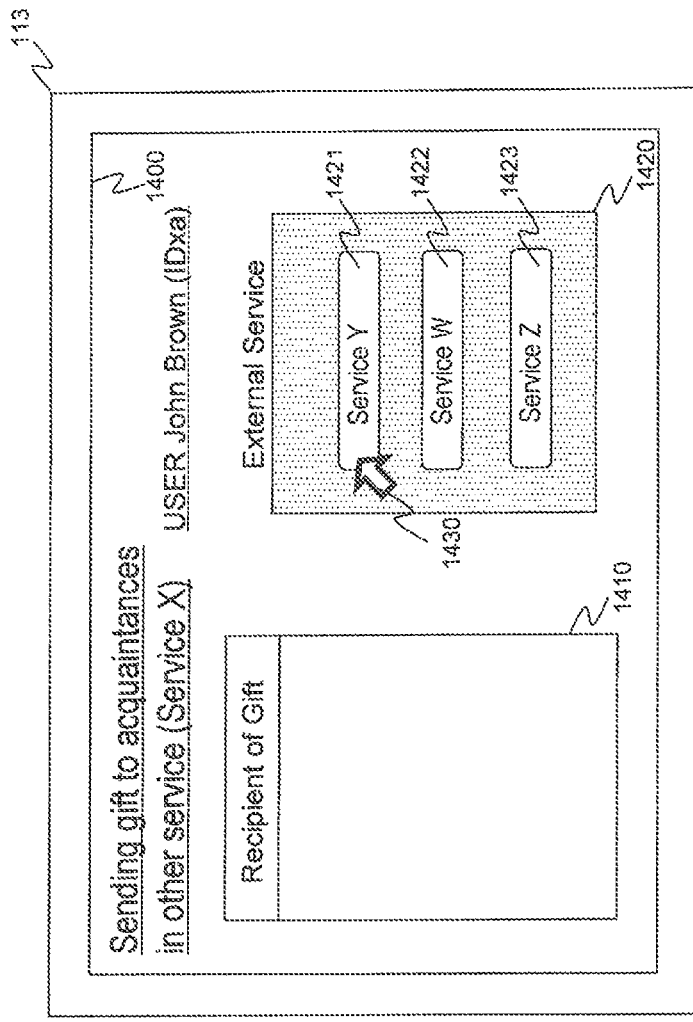
FIG. 14 is an exemplary diagram of a screen displayed on an information terminal using screen information.

Next, the HTML generation means 102 of the gateway web server generates HTML code which includes the name of user A, stored in the temporary storage means 103 in step S1204 described above, and a selection of service names of external services, and the sending and receiving means 101 sends the code to the information terminal of user A via the network 191. This transmission may be performed in plain text mode or in encrypted mode. In the information terminal of user A, the sending and receiving means 111 receives the code and after the code is analyzed by the HTML analysis means 112, the image shown in FIG. 14 is displayed on the GUI display means 113 (step S1205). In FIG. 14 a web browser window 1400 is displayed on the GUI display device 113. The gift giving service for an acquaintance in another web service, within the merchandise sales service X is displayed in this web browser window 1400. The gift giving service is one part of the merchandise sales service X. The image displayed in the web browser window 1400 includes two windows for a gift sending address list 1410 and an external service list 1420. At this point, the gift sending address list 1410 is empty.

The external service list window 1420 displayed in the web browser 1400 is explained with reference to FIG. 14. An external service is a web service used by user A such as an electronic mail service and a web service other than the merchandise sales service X. In the example shown in FIG. 14, the external service list window 1420 includes three buttons: a button 1421 for user A to send a piece of merchandise of the merchandise sales service X to an acquaintance in network service Y, a button 1422 for user A to send a piece of merchandise of the merchandise sales service X to an acquaintance in web service W, and a button 1423 for user A to send a piece of merchandise of the merchandise sales service X to an acquaintance in network service Z. As is clear from FIG. 7, FIG. 10, and FIG. 11, user A is also a user of network service Y and network service Z as well as a user of the merchandise sales service X.

User A moves a cursor 1430 displayed on the GUI display means 113 via the input/output means 114 of user A's information terminal, aligns the cursor with the button 1421 for sending a piece of merchandise of the merchandise sales service X to an acquaintance in network service Y and selects network service Y by pressing a button which is included in the input/output means 114 (step S1206). Then, the sending and receiving means 111 of user A's information terminal sends an authentication request of user A in network service Y to the gateway web server 100 via the network 119. This transmission may be performed in plain text mode or in encrypted mode. Furthermore, the sending and receiving means 101 of the gateway web server forwards the request after receiving it and sends it to the server 160 of the network service Y via the network 192. This transmission may be performed in plain text mode or in encrypted mode. Here, the screen of the web browser 1400 in the information terminal of user A is redirected to the server 160 of the network service Y from the gateway web server 100 (step S1207). When the sending and receiving means 161 of the network service Y receives the authentication request described above, the HTML generation means 165 generates an HTML code of an input screen for authenticating that the information terminal 110 of user A belongs to user A who holds the identification tag IDya. The sending and receiving means 161 sends the HTML code to the information terminal 110 of user A via network 192 and network 191. This transmission may be performed in plain text mode or in encrypted mode. This HTML code is sent to the HTML analysis means 112 via the sending and receiving means 111 of user A, is analyzed and then displayed by the GUI display means 113 (step S1208).

Figure 15:
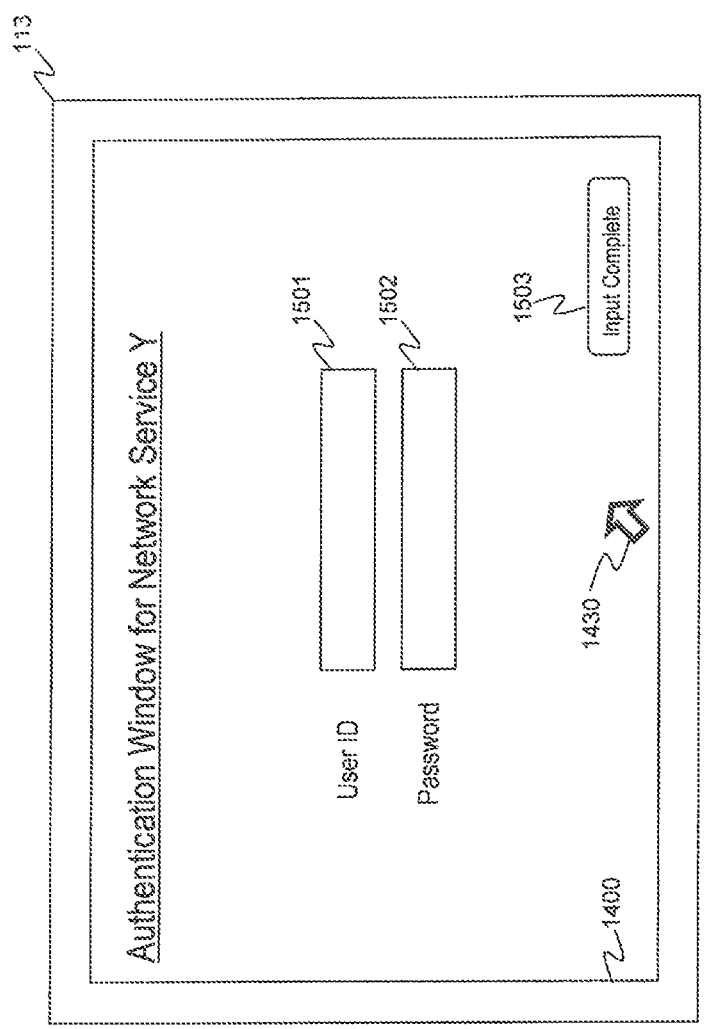
FIG. 15 is an exemplary diagram of an authentication screen of a user using the service server.

FIG. 15 is an example of a screen displayed on the GUI display means 113 on the information terminal of user A at this time. The authentication screen of the network service Y displayed on the web browser 1400 includes an identification tag input column 1501, a password input column 1502 and an input completion button 1503. After user A inputs the identification tag IDya of user A in the network service Y into the ID input column 1501 and a password into the password input column 1502, user A moves the cursor 1430 to the position of the input completion button 1503 and makes a selection by pressing the button of input means 114.

Here, the identification tag and the password of user A which is input are sent to the server 160 of network service Y via the sending and receiving means 111, the network 191 and network 192 together with an authentication request (step S1209). This transmission may be performed in plain text mode or in encrypted mode. When the sending and receiving means 161 receives these, it sends them to the authentication means 163. The authentication means 163 searches the authentication table 903 in the user database Y 152 for the received identification tag IDya which is input as a search key and after obtaining password information associated with IDya detects whether it matches the password received in step S1209. The example shown here is explained using authentication via an identification tag and a password. However, any authentication method can be used so long as the authentication request at step S1209 can be confirmed to be from user A itself or from the terminal 110 of user A.

If a match of the password described as above is detected, the social graph 902 of the user database Y 162 is searched next using the authenticated identification tag IDya of user A as a search key. Referring to FIG. 10B, IDya 1061 is searched. Next, the identification tag table 901 is searched for identification tags IDyb 1071 and IDyd 1072 associated with IDya 1061 as search keys. Referring to FIG. 10A, the identification tags IDyb 1012 and IDyd 1013 are detected. Next, the sending and receiving means 161 sends the identification tag IDya to the gateway web server 100 via the network 192. In addition, at the same time, nicknames nikki 1022 and naam 1023 which are associated with the identification tags IDyb and IDyd in the identification tag table 901 described above are sent to the gateway web server 100. Similarly in step S1203, if a UID associated with IDya exists in the identification tag table 901, this UID is associated with IDya and sent to the gateway web server 100 (step S1210). This transmission may be performed in plain text mode or in encrypted mode.

Next, the sending and receiving means 101 of the gateway web server receives this information and stores it in a table of session n in the temporary storage means 103 (step S1211). As already explained, the temporary storage means 103 is a means for temporary storage for each session of a gift giving service to an acquaintance in another web service and when each session is completed the information is deleted.

The table 1301 of this session n in the temporary storage means of the gateway web server is shown in FIG. 16 at the stage where step S1211 is completed. However, in the example shown in the present embodiment, because the UID of user A is not stored in the table 1301 of session n, the UIDa 1600 shown in FIG. 16 is left blank at this point and is in the state as shown in FIG. 16 is at the step S1703 below. Here, in the case where the server of gateway web service obtains an UID of user in step S1204, then the identification tag and name 1601 in the merchandise sales service X of user A are as shown in FIG. 16. Identification tags IDyb 1614, IDyd 1615 which are associated with identification tag IDya 1602 in the network service Y of user A and stored, and the nickname, the UID and the encryption key associated with each of these identification tags are the information received by the server of the network service Y in step S1211.

In an example shown in the present embodiment, the UID of user A is not stored in the table 1301 of session n in step S1204 described above. Thus, next, the server of the gateway web service obtains of the UID of user A from the encryption user information server 170, and a process for storing the fact that IDxa and IDya are the identification tags of the same user is explained with reference to the flowchart in FIG. 17. If the server of gateway web service obtains the UID of user A in step S1204, the process proceeds to step 1901 in FIG. 19 without performing the process in FIG. 17 (step S1212).

In the case where the UID of user A is not received in steps S1204 and S1211, first, user A sends an issue request of the UID corresponding to identification tags IDxa 1601 and IDya 1602 to the encryption user information server 170 via network 192 (step S1701). This transmission may be performed in plain text mode or in encrypted mode. When the sending and receiving means 501 of the encryption user information server receives this, the UID generation means 503 searches the encryption user information table 502 and generates a new UID which hasn't previously existed. Next, the sending and receiving means 501 sends this new UID as the UID of the user A to the gateway web server 100 via the network 192 (step S1702). This transmission may be performed in plain text mode or in encrypted mode. An example of the encryption user information table 502 included in encryption user information server 170 is shown in FIG. 18. The encryption user information table 502 includes a UID column 1810, an encryption identification tag group 1820, and an encryption address information column. In the step S1702 described above, the UID generation means 503 generates a UID which is not in the UID column 1810. The encryption identification tag group column 1810 and encryption address information column 1830 is explained below.

The sending and receiving means 101 of the gateway web server receives a new UIDa, and the UIDa is stored in the UID column 1600, which is empty previously, in the table 1301 of the session n of the temporary storage means 103 (step S1703). Next, the encryption key generation means 108 of the gateway web server generates an encryption key for the UIDa, that is, an encryption key Ka for user A (step S1704). Next, the sending and receiving means 101 sends UIDa and Ka to the server 150 of the merchandise sales service X and the server 160 of the network service Y via the network 192 (step S1705). In the server of the merchandise sales service X, the sending and receiving means 151 receives the UIDa and Ka, and stores them in the identification tag table in database X (step S1706). Referring to FIG. 7, UIDa is stored in the place 741 and Ka is stored in the place 751. Similarly, in the server of the network service Y, the sending and receiving means 161 receives the UIDa and Ka, and stores them in the identification tag table 901 in database X. Referring to FIG. 10A, UIDa is stored in the place 1041 and Ka is stored in the place 1051.

Next, the encryption means 105 encrypts, with the encryption key Ka generated in step S1704 described above, IDxa 1601 stored in the table 1301 of the session n of the temporary storage means and X which shows that it is an identification tag of the merchandise sales service X, as well as IDya 1602 and Y which shows it is an identification tag of the merchandise sales service Y (step S1707). Here, encrypted information is notated as Eka (IDxa-X, IDya-Y). Next, sending and receiving means 101 sends UIDa and Eka (IDxa-X, IDya-Y) to the encryption user information server 170 via the network 192. The sending and receiving means 501 of the encryption user information server receives this, adds it to a new row in the encryption user information table 502 and associates UIDa and Eka (IDxa-X, IDya-Y) and stores them (step S1708).

Figure 17:
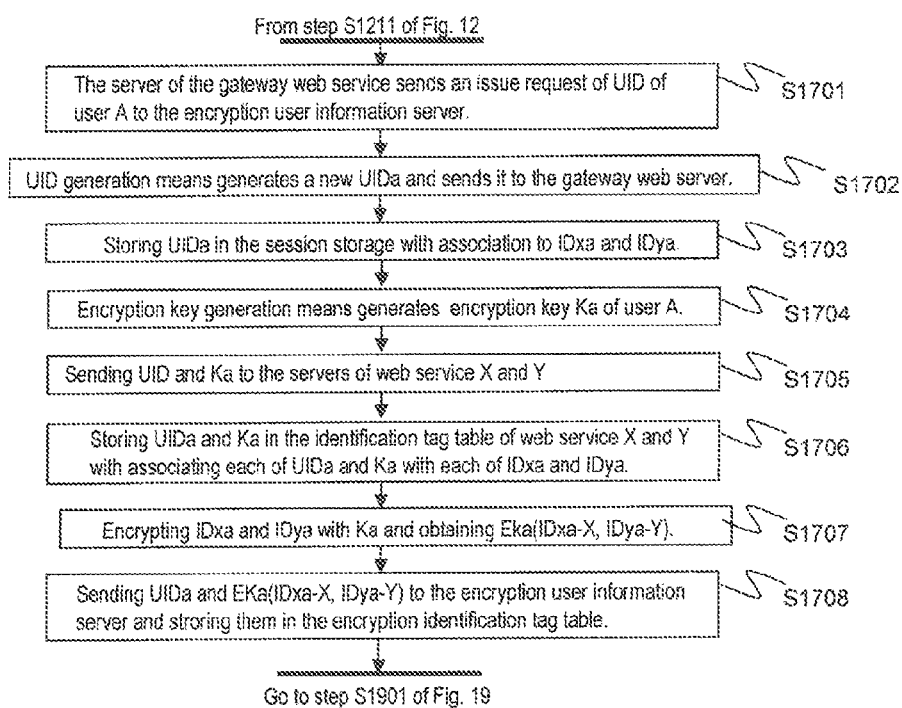
FIG. 17 is a flowchart of a process which generates identification information.

In the example of the present embodiment, before session n begins, UIDb and encryption key Kb of user B are stored in the identification tag table 601 of the server of merchandise sales service X and the identification tag table 901 of the server of network service Y. This is a result of a face that user B used a gift giving service to an acquaintance in another web service in the merchandise sales service X or network service Y before session n begins and a corresponding processes up to step S1708 and a process equivalent to FIG. 17 are performed. Here, the process in FIG. 17 explained here is used not in session n but in sessions subsequent to session n, and is used when user A or another user uses a gift giving service to an acquaintance in another web service using a gateway web service.

Figure 19:
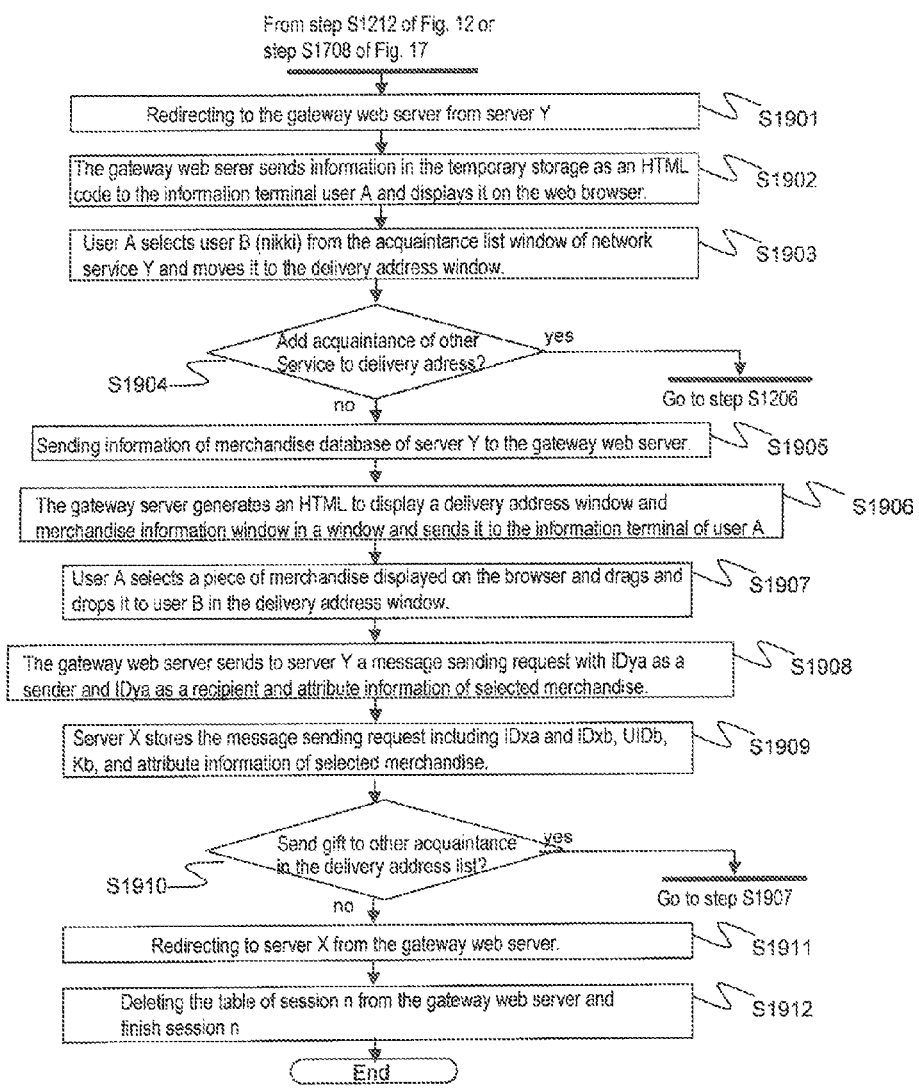
FIG. 19 is a flowchart of a process in the gateway server device.

Next, processes in the gift giving service of merchandise sales service X used by user A who uses the gateway web service 100 is explained with reference to the flowchart in FIG. 19. The screen of the web browser 1400 of user A's information terminal is redirected to the server 100 of the gateway web service from the server 160 of the network service Y (step S1901). Next, the HTML generation means 102 generates HTML code which generates the screen in FIG. 20 from the table 1301 of the session n in the stated shown in FIG. 16, and sending and receiving means 101 receives this and sends it to the information terminal 110 of user A via network 192. This transmission may be performed in plain text mode or in encrypted mode. In the information terminal of user A, the sending and receiving means 111 receives this and displays it in the web browser 1400 of the GUI display means after analysis by the HTML analysis means 112 (step S1902).

Figure 20:
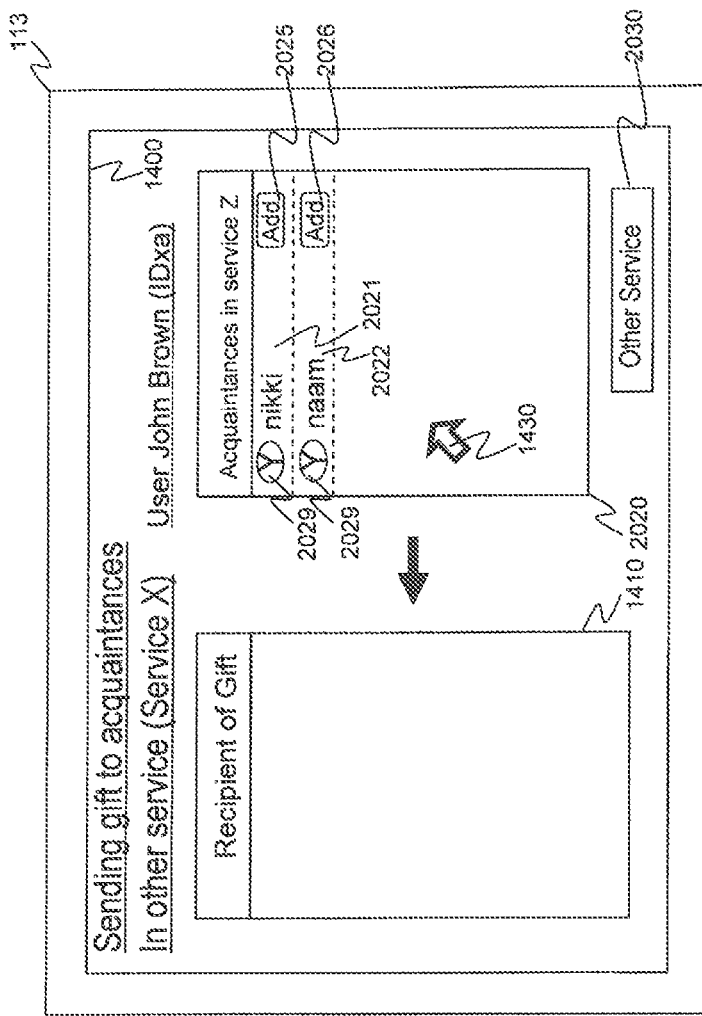
FIG. 20 is an exemplary diagram of a screen displayed on an information terminal using screen information.

An example of the image displayed in the GUI display means 113 of user A's information terminal is shown in FIG. 20. An acquaintance list window 2020 of network service Y is displayed in the web browser 1400 together with the acquaintance list window 1410 of service X already explained in FIG. 14. Nikki 2021 and naam 2022 are displayed in the acquaintance list window of network service Y. These show that information in the table of session n in the temporary storage means of the gateway web server is received as HTML code. In FIG. 20, mark 2029 shows that a displayed user is a user of the network service Y. As is clear from FIG. 16, nikki 2021 is the nickname of user B who holds the identification tag IDyb of network service Y and naam 2022 is the nickname of user D who holds the identification tag IDyd of network service Y.

Next, user A moves the cursor 1430 displayed in GUI display means 113 by operating the input means 114, aligns the cursor with the Add button 2025, presses a button included in the input means 114 and selects the add button 2025. In addition, instead of pressing the add button 2025, the user aligns the cursor 1430 with the displayed object 2021 showing nikki in web browser 1400, and while selecting by pressing a button included in the input means moves the cursor 1430 within the acquaintance list window 1410 of the merchandise sales service X, releases the selection, and this is similar when so called a drag and drop is performed. This operation is where user A selects user B who is an acquaintance in the network Y as an address for sending a good using the merchandise sales service X.

Figure 21:
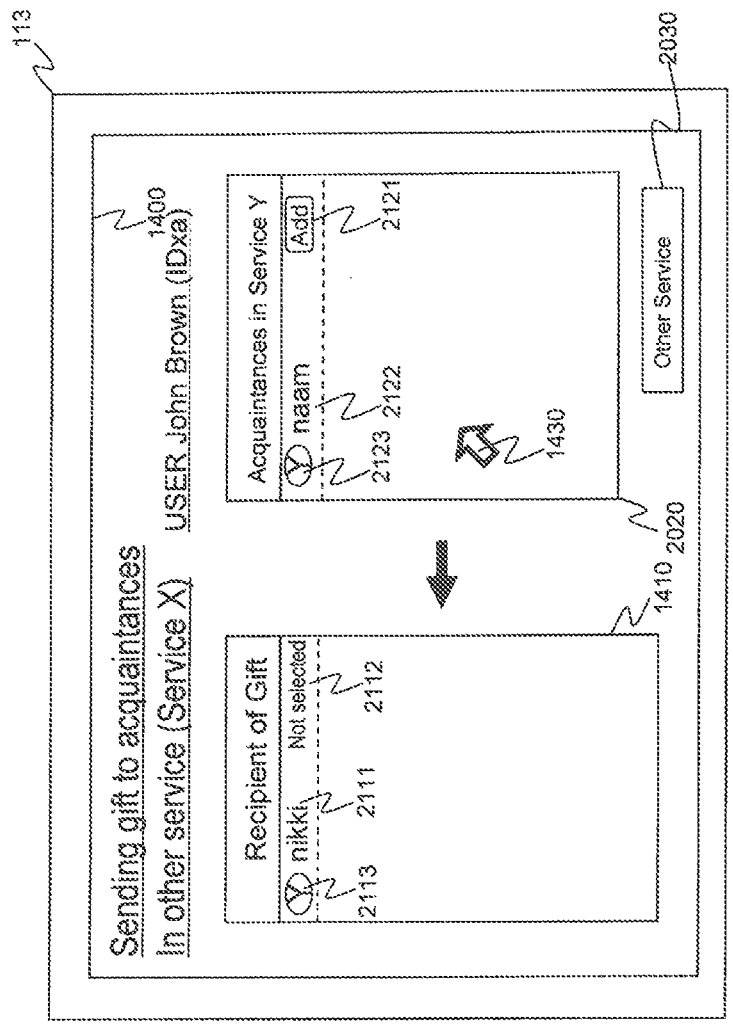
FIG. 21 is an exemplary diagram of a screen displayed on an information terminal using screen information for specifying the user of a delivery address.

Information that the add button 2025 has been pressed or that a drag and drop has been performed is sent to the gateway web server 100 via network 191 by the sending and receiving means 111. When the sending and receiving means 101 receives this information, the HTML generation means 102 generates a new HTML code for displaying a screen as shown in FIG. 21. This new HTML code is sent to the information terminal of user A via the sending and receiving means 101 and network 191. This transmission may be performed in plain text mode or in encrypted mode. When the sending and receiving means 111 receives this, the image shown in FIG. 21 is displayed on the web browser 1400 of the GUI display means 113 after analysis by the HTML analysis means 112 (step S1903).

In the screen shown in FIG. 21, an object 2111 which shows that user B is in an acquaintance relationship in network service Y with user A and has the nickname nikki in network service Y is newly added to the acquaintance list window 1410 of merchandise sales service X. The characters "not selected" 2112 is displayed in the object 2111 which represents user B. This means that the process in which user A specifies a merchandise delivery address in step 1903 to user B in merchandise sales service X is completed but the merchandise to be sent is not yet selected. This does not have to be the characters "not selected" but can be any display which means a state before a piece of merchandise is selected. In addition, in the example shown in FIG. 21, as a result of the operation in step S1903, the object 2021 which represents user B shown in FIG. 20 is deleted from the acquaintance list window 2020 of network service Y in FIG. 21. However, the object does not have to be deleted.

Here, in the case where a piece of merchandise is sent to an acquaintance in another web service in addition to user B who is an acquaintance in the network service Y via the merchandise sales service, the process returns to step S1206 described above. If this is not case, the process proceeds to step S1905 (step S1904).

Here, as an example illustrating the method of the present invention, suppose user A performs a process for sending a piece of merchandise in merchandise sales service X to a user F in network service Z by the processes after step S1206 described above. Because the details of this process are the same as to the user B up until this point, the explanation of the details can be omitted. Referring to FIG. 11, in the user database 182 of the server of network Z, user E and user F are acquaintances of user A in the network service Z. Therefore, in the process equivalent to step S1210, information in FIG. 11A is sent to table 1301 of session n of the temporary storage means 103 of the server in gateway web server. The table 1301 of session n after the process equivalent to step S1211 is as shown in FIG. 22. When FIG. 16 and FIG. 22 are compared, information of an acquaintance of user A in the network service Z is associated with the identification tag IDza and newly stored. Furthermore, as is clear from FIG. 11A, user F does not hold UID 1133 and encryption key 1043 at the point of the process equivalent to step S1210. In this case, after this, the equivalent processes from step S1701 to step S1706 are performed, UIDf and Kf are stored in the identification table 905 of the server of network service Z and the table 1301 of session n in the gateway web server.

Figure 23:
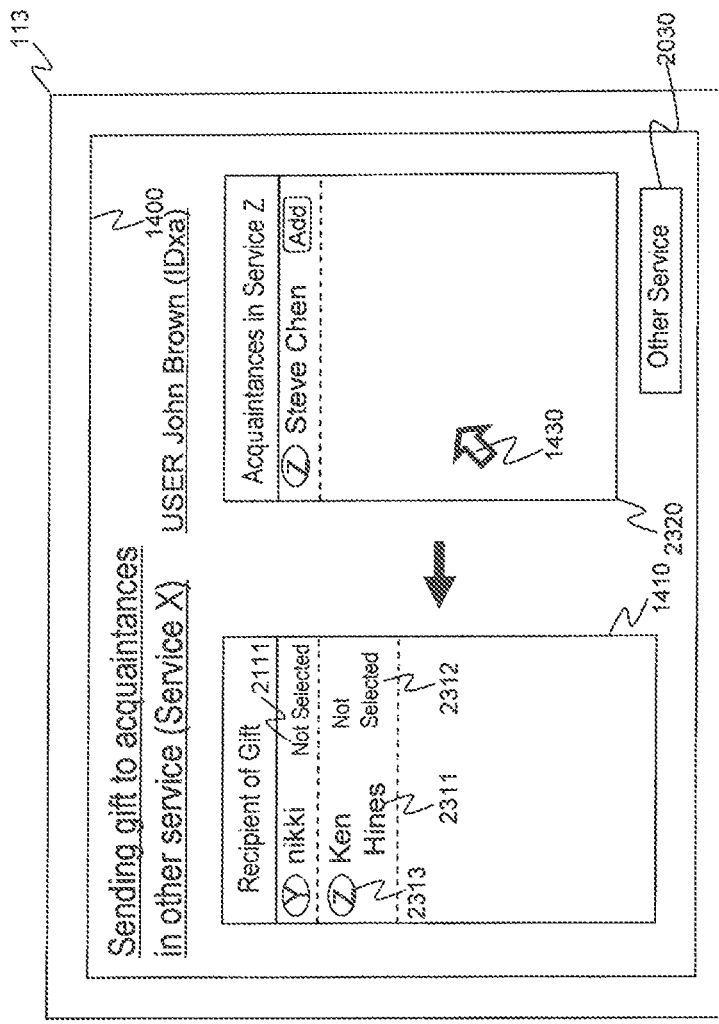
FIG. 23 is an exemplary diagram of a screen displayed on an information terminal using screen information for specifying the user of a delivery address.

Furthermore, user A moves to a gift delivery address window by a process equivalent to the step S1903 described above. Then, an image as shown in FIG. 23 is displayed in the GUI display means 113 of the information terminal of user A. When FIG. 21 and FIG. 23 are compared, the name Ken Hines 2311 of user F which is an acquaintance of user A in the network service Z is newly displayed by the process described above. In this way, an acquaintance in various web services can be added to a gift delivery address in the merchandise sales service X.

Again referring to FIG. 19, the processes after selection of a merchandise delivery address has finished is explained. When user A has finished selection of a merchandise delivery address by the process described above, the process proceeds to step S1905. Next, the sending and receiving means 101 of the gateway web server sends a request for merchandise data via network 192 to the server 150 of merchandise sales service X. Next, the search means 154 of the server 150 of merchandise sales service X searches the merchandise database 158 and the search result, as shown in FIG. 8(b), including a merchandise number, an image, an attribute and price, is sent to the gateway web server 100 via the sending and receiving means 151 and the network 191 (step S1905). This transmission may be performed in plain text mode or in encrypted mode. In the example of the present embodiment, suppose that information including merchandise numbers MID1, MID2, MID3 and MID4 is sent to the gateway web server 100. The sending and receiving means of the gateway web server 100 which receives this information stores this information in the table 1301 of session n in the temporary storage means.

Figure 24:
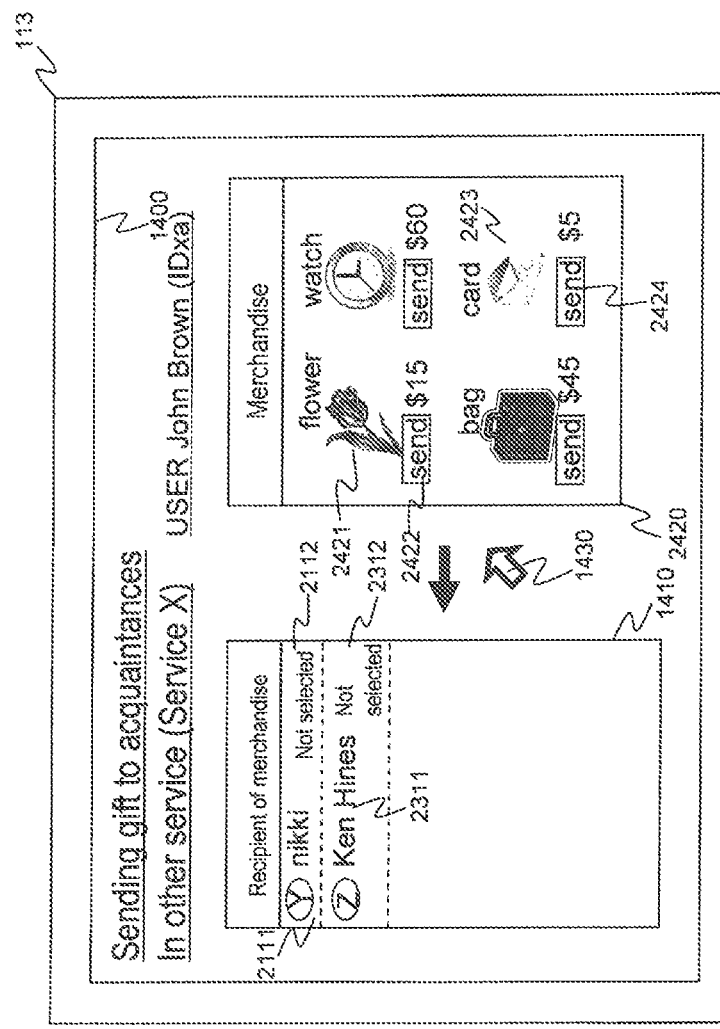
FIG. 24 is an exemplary diagram of a screen displayed on an information terminal for specifying merchandise to be delivered.

Next, the HTML generation means 102 of the server of the gateway web service generates a HTML code for displaying the image shown in FIG. 24, and the sending and receiving means 101 sends the HTML code to the information terminal 110 of user A via the network 191 (step S1906). This transmission may be performed in plain text mode or in encrypted mode. Next, the HTML analysis means 112 in the information terminal of user A analyzes the received HTML code in steps S1906 described above and the image shown in FIG. 24 is displayed on the GUI display means 113.

Referring to FIG. 24, a merchandise list window 2420 is displayed as well as a merchandise delivery address window 1410. Merchandise information received in step S1906 described above is displayed in the merchandise list window. Next, user A aligns the cursor 1430 with the object 2421 of the flower within the merchandise list window, and while selecting by pressing a button included in the input means, moves the cursor 1430 to the object 2111 of user B within the merchandise delivery address window 1410, and releases the selection, and a drag and drop operation is performed (step S1907). User A moves the cursor 1430 using this input means 114 and after selecting the object 2111 of user B, selects the send button 2422 which is attached to the flower object, presses the button of the input means and the following processes are similarly performed. This process which is performed by user A means that user A sends flowers to user B who is an acquaintance in the network service Y.

Next, the sending and receiving means of the gateway web server sends a message sending request which includes the identification tag IDya of user A in the network service Y as the sender and the identification tag IDyb of user B in the network service Y as the receiver, to the server 160 of the network service Y via network 192. In addition, at the same time, UIB which is the UID of User B and Kb, and merchandise attribute information selected in step S1907 described above are sent to server 160 of the network service Y (step S1908). All of this information is sent from the table 1301 of session n in the temporary storage means 103. In the present embodiment, subsequent examples are explained using an example of sending prices amount the merchandise attribute information sent here, however, attribute information, which is sent here, is not limited to prices. Next, a message sending request which includes IDya and IDyb, UIDb, Kb and the prices which are merchandise attribute information selected in step S1907, are stored by the storage means 167 of the server of network service Y (step S1909).

User A can also send a piece of merchandise to another merchandise delivery address (step S1910). Here, suppose that user A sends a card to user F who is an acquaintance in the network service Z by the equivalent process as steps S1907 to S1909. Referring to FIG. 24, user A drags and drops object 2423 of a card within the merchandise window 2420 to the object 2311 of user F within the window of the merchandise delivery address 1410 (equivalent to step S1907). Then, the gateway web server sends a message sending request which includes the identification tag IDza 2200 of user A in the network service Z as the sender, and the identification tag IDzf of user F as the receiver to the server 180 of network service Z (equivalent to step S1908). Following this, the storage means 187 of network service Z stores the message sending request (equivalent to step S1909).

At the point where the processes described above are completed, the "not selected" display 2112 attached to the object of user B and the "not selected" display 2312 attached to the object of user F shown in FIG. 24 are no longer displayed. A character string or an image which displays that the desire to receive by User B or user F, which is a merchandise delivery address, is being confirmed is displayed instead of this "not selected" display.

With this process, when selection of a piece of merchandise for an acquaintance in a delivery address list is completed, the browser of User A is redirected to the server 150 of the merchandise sales server X from the gateway web server 100 (step S1911). Furthermore, the table 1301 in session n of the temporary storage means 103 in the gateway web server is deleted and session n is terminated (step S1912).

Figure 25:
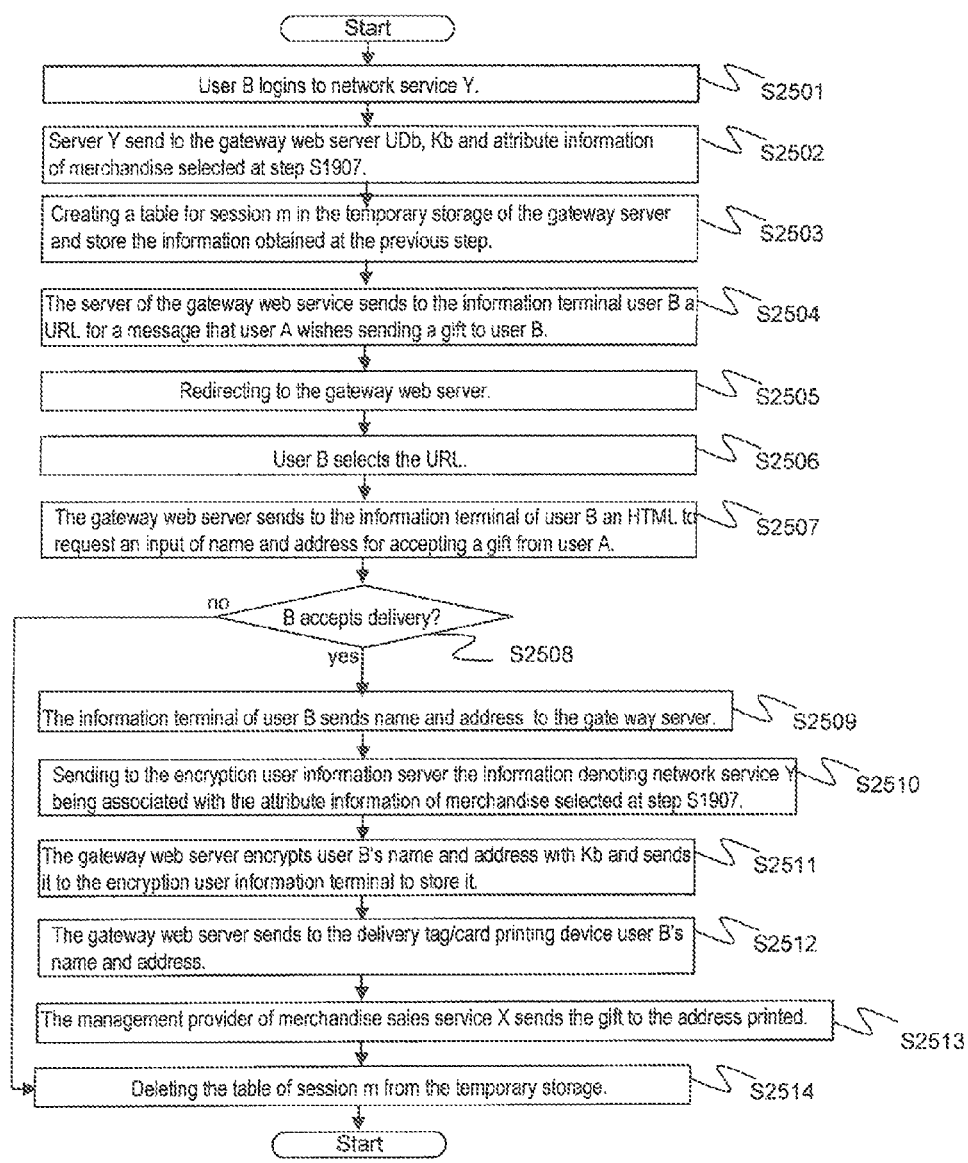
FIG. 25 is a flowchart of a process for judging whether it is possible to obtain address information of a user of a delivery address.

Next, referring to the flowchart in FIG. 25, a process is explained whereby user B agrees to receive the merchandise from user A and the provider of merchandise sales service X sends the merchandise to user B. After the process in step S1909 is performed, user B accesses the server 160 of the network service Y from the information terminal 120 of user B, and an HTML code which displays a screen for requesting a login information generated by the HTML generation means 165 of the server of network service Y is received via networks 191 and 192. User B sends his/her identification tag and password in the network service Y to the server 160 of network service Z via the networks 191 and 192. The authentication means 163 authenticates that these piece of information is those of user B, or that it is sent from the information terminal 120 of user B, and a login is granted to user B to the network service Y (step S2501).

Next, UIDb stored in step S1909, encryption key Kb, and the merchandise attribute information selected in step S1907 described above are sent to the gateway web server 100 via network 192 (step S2502). This transmission may be performed in plain text mode or in encrypted mode. Next, a table of session m in the temporary storage means 103 in the server of gateway web service is created, and UIDb, Kb and the merchandise attribute information selected in step S1907 and received from the server of network service Y are stored (step S2503). Next, the HTML generation means 102 of the server of the gateway web service generates a HTML code for displaying the image shown in FIG. 26. The sending and receiving means 101 sends the HTML code to the information terminal 120 of user B via the network 191 (step S2504).

Figure 26:
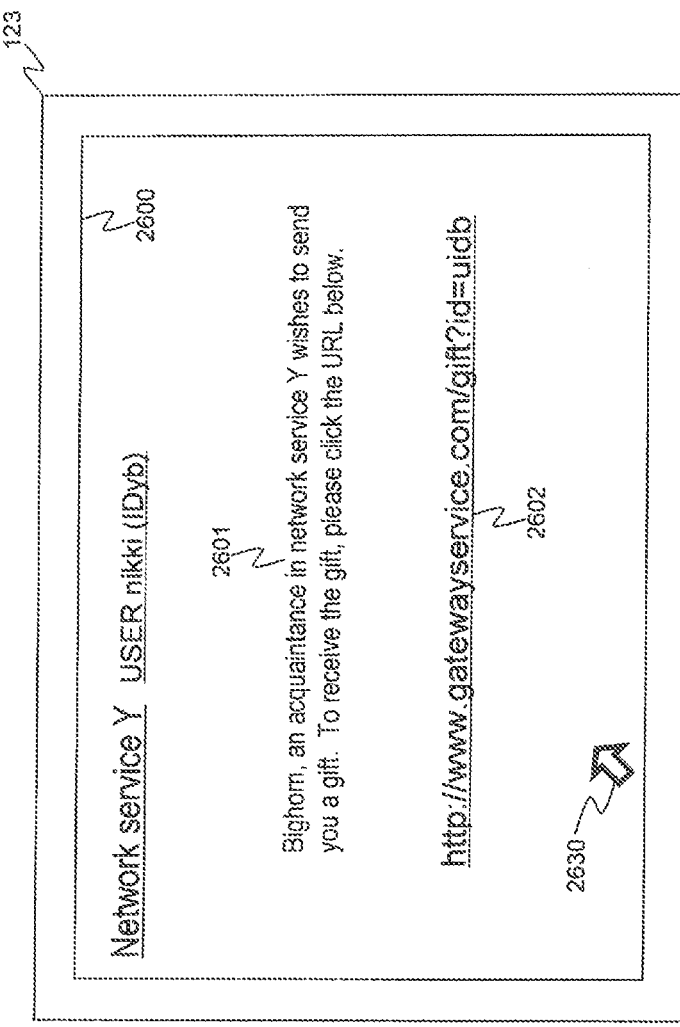
FIG. 26 is an exemplary diagram of a screen displayed on an information terminal for asking permission to a user of a delivery address.

Next, the web browser window 2600 is redirected to the serve of the gateway web service 100 by the server 160 of the network service Y (step S2505). Next, after the sending and receiving means 121 in the information terminal of user B receives the HTML code, the HTML analysis means 122 analyzes the code and the image shown in FIG. 26 is displayed by the GUI display means 123. Referring to FIG. 26, the GUI display means 123 includes the web browser window 2600. The HTML code is displayed within the web browser window 2600. A message 2601 that user A is attempting to send a user a piece of merchandise is displayed in the web browser window 2600. Furthermore, a note to click URL display 2602 in order to receive the piece of merchandise is displayed in the message 2601. User B operates the input means 124 of the information terminal 120, operates the cursor 2630 which is displayed in the GUI display means, moves the cursor to the URL 2602, and makes a selection by pressing the button in the input means 124 (step S2506). Then, sending and receiving means 111 sends a message to the gateway web server 100 via that URL 2602 has been selected via the network 191.

Figure 27:
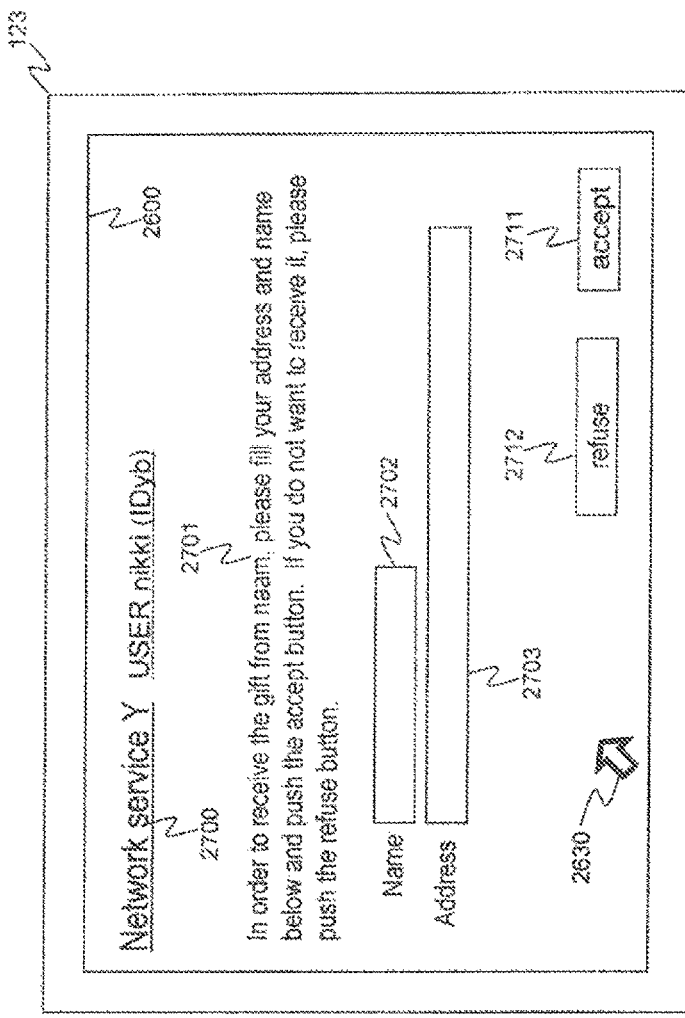
FIG. 27 is an exemplary diagram of a screen for a user of a delivery address to input address information.

Next, when the sending and receiving means 101 of the gateway web server receives this message, the HTML analysis means generation means 102 generates a HTML code for displaying the image shown in FIG. 27. Next, the sending and receiving means sends this HTML code to the information terminal 120 of user B via the network 191 (step S2507). The sending and receiving means 121 of the information terminal of user B receives the HTML code and displays it on the GUI display means 123 after analysis by the HTML analysis means 122.

An image such as that shown in FIG. 27 is displayed in the web browser window 2600 displayed in the GUI display means 123 of the information terminal of user B. In the present embodiment, this image is displayed as a part of the network service 2700, however, in an example in other embodiments, this image may be displayed as a part of the merchandise sales service X and may be displayed as a part of a different service offered by management providers of the encryption user information server 170. Again referring to FIG. 27, a message 2701 for asking whether user B is willing to accept the merchandise from user A is displayed in web browser window 2600. The message shown in FIG. 27 is an example and any message may be displayed as long as it enquires the willingness of the user to accept the merchandise. In addition, a name input section 2701 and address input section 2703 are displayed in the web browser window 2600.

If user B operates the input means 124, moves the cursor 2630 to the refusal button 2712, and makes a selection by processing a button of the input means 124, it is determined that user B has refused to accept the merchandise from user A (step S2508). In this case, the process proceeds to step S2514 described below. If user B operates the input means 124, inputs his/her own name in the input section 2702 and his/her own address in the input section 2703, and moves the cursor 2630 to the accept button 2711, and makes a selection by pressing the button of input means 124, it is determined that user B accepts the merchandise from user A (step S2508). In this case, the process shifts to step S509. Furthermore, merchandise information such as the name and image of the merchandise which user A attempts to send to user B is displayed on the screen shown in FIG. 27.

Figure 28:
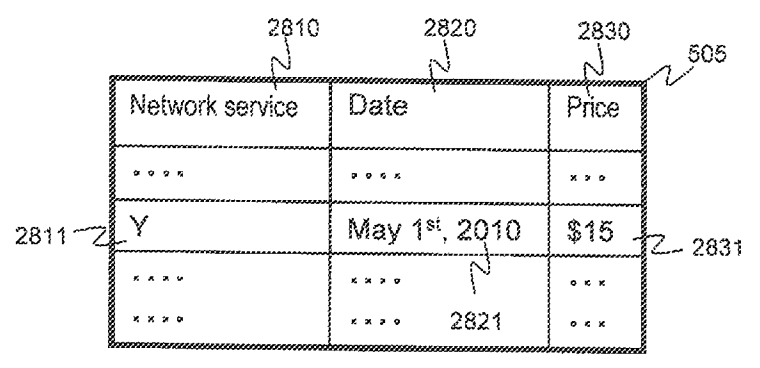

When the willingness of user B to accept a piece of merchandise from user A is expressed at the process explained in step S2507, the sending and receiving means 121 of the information terminal of user B sends the name and address which user B inputs to the gateway web server 100 via the network 191 (step S2509). Furthermore, the sending and receiving means 101 of the gateway web server associates, for example, information which represents network service Y such as a character string Y, with price which is attribute information of the merchandise selected in step S1907, and sends to the user information server 170 via network 192. The sending and receiving means 501 of the encryption user information server receives this information and stores it in the social graph history storage means 505 (step S2510). An example of a social graph history table in the social graph history storage means 505 is shown in FIG. 28. Information 2811 received in step S2510 for identifying a web service, merchandise price 2811 which is attribute information of a piece of merchandise selected in step S1907, and a date 2821 on which user B accepts to receive a piece of merchandise from user A, are associated and stored. Products sold in the merchandise sales service X or the sender and receiver are not stored in the social graph history storage table. In this point, the social graph history storage table is not a history of merchandise sales. However, which social graph was used on a web service to realize gift merchandise sales in the merchandise sales service X by the method of the present invention is stored in the social graph history storage table. Furthermore, referring to FIG. 5 again, the social graph history storage means 505 exists in the encryption user information server 170 in the example shown in the present embodiment. However, the social graph history storage means may also exist outside of the encryption user information server 170. For example, another server may exist as the encryption user information server and this may be connected to the gateway web server via the network 192. In this case, the social graph history table shown in FIG. 28 is also created by the process in step S2510.

Next, the encryption means 105 of the gateway web server encrypts the name and address of user B received by the sending and receiving means 101 from the information terminal of user B in step S2509 using the encryption key Kb stored in the table of session m. Here, encrypted information is notated as Ekb (Nameb, Addrb). Next, the sending and receiving means 101 sends the address and the name, which are encrypted, to the encryption user information server 170 via network 192. Here, after Ekb (Nameb, Addrb) is received by the sending and receiving means 501 of the encryption user information server, it is associated with UIDb and stored in the encryption user information table 502 (step S2511). Referring to FIG. 18, Ekb (Nameb, Addrb) 1831 is stored in the encryption address information column of the encryption user table 502 by this process.

Next, the sending and receiving means 101 of the gateway web server sends the address and name of user B stored in the temporary storage means 103 and table 1302 of session m to the delivery tag/card printing device 190 via network 192 (step S2512). Here, the management provider of merchandise sales service X sends the gift from user A to user B using the printed delivery address (step S2513). Here, in the delivery tag/card printing device 190, the name and address of user B, which is sent in step S2511, is not stored in a nonvolatile memory device such as a disk drive but deleted from the storage means when printing is completed (step S2514).

Next, the operational effects of the present invention are explained. In the method, the system, the server device and the information terminals of the present invention, a network service provider which includes a social graph does not provide an identification tag or acquaintance relationship of its users to the merchandise sales server provider. However, a user of the merchandise sales service can use an acquaintance relationship in another network service using the merchandise sales service. In addition, the user of the merchandise sales service can uniformly use an acquaintance relationship which is spread out over many network services. Furthermore, it is possible to store which acquaintance relationship in which network service a trade which is realized in the merchandise sales service has come from in the encryption user information server.

First, referring to FIG. 10 and FIG. 11, although the above described merit is realized, it can be easily understood that the server of the network service Y does not include any identification tag or any relationship of other network service including the merchandise sales service X and network service Z.

In addition, for example, suppose that the gateway web server 100 and the encryption user information server 170 in the present embodiment are managed by a different provider to the provider of the merchandise sales service X, network service Y and network service Z. At this time, referring to FIG. 18 for example, the identification tag group 1820 and encrypted address information in various network services associated with a UID are stored in the encryption identification tag server. Here, referring to FIG. 5, FIG. 7, FIG. 10A and FIG. 11A, a key for decrypting the encrypted identification tag group does not exist in the encryption identification tag server and a key necessary for decryption exists in the network service Y or network service Z. Therefore, a provider of the encryption user information server can not obtain any information or any social graph of a user including an identification tag of the network service Y or network service Z. Similarly, referring to FIG. 16 and FIG. 22 although user information of the merchandise sales service or network service is temporarily stored in the temporary storage means or each session in the gateway web server 100, it is not necessary to store or keep this information in a nonvolatile storage means such as a disk device. As a result, a management provider of the gateway web server does not need to hold a database which includes identification tags, social graphs or additional information of users of another service provider such as the merchandise sales service X, network server Y or network service Z. Despite this, it is possible to realize the service explained in the present embodiment and both a server provider and user can enjoy the benefits described above.

In addition, a table as shown in FIG. 28 is stored in the social graph history storage means 500 of the encryption user information server 170. Which acquaintance relationship provided by a network service was relied on for the sales achieved in the merchandise sales server X is stored in the column 2810 of this table. In addition, attributes such as the date 2820 and price of the merchandise sold is associated with this information and stored. This is not encrypted but saved as text. However, identification tags of users, social graph and attribute data, etc. of merchandise sales server X, network service Y, etc. are not included. However, it is possible to evaluate the contribution of each network service which provides a social graph to the sales in the merchandise sales service X by using the information stored in this table. It is possible to pay each network service which provides a social graph such as network service Y or network service Z according to their contribution a proportion of the profit of the merchandise sales service X based on the information in this table. In this way, it is possible to form a motive for allowing a network service use of a social graph to the merchandise sales service which was impossible in a conventional server or system. This increases user convenience and the profits of the merchandise sales service.

In addition, in the present embodiment of the present invention a management server device stores an encrypted identification tag as is shown in FIG. 18. In this way, it is possible to associate and store another person's identification tag which is the identification tag of another user in this service server, with an identification tag for identifying a user within any one of a plurality of service servers, and furthermore, it is possible to provide the gateway server device with a first receiving part which receives a first other person identification tag which is associated with a first identification tag and stored from transmission with a service server, from a first service server which is one service server which can associate an identification tag which can uniquely identify a user in a plurality of service servers and store an encryption key generated for each of these identification tags, a first storage part which associates the first other person identification tag which is received by the first receiving part with an identifier of the first service server and stores in a temporary table, a second receiving part which receives the second other person identification tag which is associated and stored with a second identification tag which identifies in the second service server a user identified by the first identification tag from a second service server which is another one of the plurality of service servers, a second storage part which associates the second other person identification tag received by the second receiving part with an identifier of the second service server and stores in the temporary table, and when it is judged in the transmission that the first other person identification tag received by the first receiving part is associated with first identification information and a first encryption key and stored in the first service server, an identification information part which sends the identification information associated and stored with the first other person tag, and an encryption information receiving part which receives encryption information which encrypts information which includes the identifier of the first service server from the first encryption key according to the first identification information sent from the identification information sending part.

In this way, it is possible to include a first command part which commands to the first service server to send a first message to the user identified from the first other person identification tag if an identifier of the second service server is not included as a result of decrypting the received encryption information with the first encryption key.

In addition, it is possible to include in the first message information for a user identified by one of the other person identification tags to be able to use the second service server.

In addition, it is possible to include a second command part in the gateway server device, the command part commanding the first service server to send a second message to the user identified by the first other person identification tag, when as a result of decrypting the received encrypted information with the first encryption key, an identifier of the second service server is included and if Identification information which is associated and stored with the first other person identification tag by the first service server, and identification information which is associated and stored with the first other person identification tag by the second service server, is different In this way, it is possible to include information in the second message for associating the second other person identification tag with the second identification tag in the second service server to a user identified by one of the first other person identification tags.

In addition, the gateway service device can further include a screen information sending part sends screen information for displaying in a first region characters or an image which represent a first other person identification tag stored by the first storage part and for displaying in a second region which can be dragged to the first region characters or an image which represents a second other person identification tag stored by the second storage part, a drag detection part which detects that characters or an image which represent the second other person identification tag in the screen information sent by the screen information sending part has been dragged, and a judgment starting part which starts a judgment as to whether an identifier of the second service server is included as a result of decrypting the received encryption information with the encryption key when drag has been detected by the drag detection part.

What is claimed is:

1. A gateway server device configured to communicate via network with a user terminal, a first service server, a second service server, a management server, and a gift delivery server, the gateway server device comprising:
   at least one processor;
   at least one memory;
   a first receiving section configured to receive a first identification tag identifying a first user from the first service server;

a second receiving section configured to receive, from the second service server, one or more identification tags of one or more other users associated with the first user identified by the first identification tag received by the first receiving section;

a third receiving section configured to receive a command from the user terminal for selecting an identification tag as a second identification tag from the one or more identification tags of one or more other users, which are received by the second receiving section, wherein the user terminal being operated by the first user identified by the first identification tag;

a fourth receiving section configured to receive from the second service server an encryption key associated with the second identification tag; and a fifth receiving section configured to receive from the management server encrypted address information of a second user identified by the second identification tag;

a decryption section configured to decrypt the encrypted address information using the encryption key received by the fourth receiving section;

a first sending section configured to send decrypted address information to the gift delivery server.

2. The gateway server device according to claim 1 further comprising:

a sixth receiving section configured to receive address information via the second service server from the second user identified by the second identification tag;

an encryption section configured to generate an encryption key and to generate encrypted address information by encrypting a received address information using the generated encryption key;

a second sending section configured to send the generated encryption key to the second service server together with the second identification tag; and a third sending section configured to send the second identification tag and the encrypted address information to the management server device.

3. The gateway server device according to claim 1 further comprising:

a seventh receiving section configured to receive information which represents whether received encrypted address information by the fifth receiving section is acceptable or not from the second user identified by the second identification tag.

4. The gateway server device according to claim 1 further comprising:

a fourth sending section configured to send screen information for displaying a first region and a second region, the screen information displaying in the first region the one or more identification tags received by the second receiving section so that the one or more identification tags can be dragged to the second region; and an fifth sending section configured to send a command for the third receiving section to receive an identification tag dragged to the second region.

5. The gateway server device according to claim 4 wherein the screen information is information for displaying a third region for displaying information on merchandise and for making dragging information on merchandise to a position at which the displayed identification tag is dragged to the second region, and the third receiving section includes a eighth receiving section for receiving the command with information on the dragged merchandise.

6. The gateway server device according to claim 1 further comprising a deletion section configured to delete the first identification tag, the one or more identification tags of one or more other users, the encryption key and the encrypted address information, which are received, when a communication session with the first service server is complete.

* * * * *